US012586909B2

(12) United States Patent
Shi et al.

(10) Patent No.: US 12,586,909 B2
(45) Date of Patent: Mar. 24, 2026

(54) MICROSTRIP ANTENNA AND ELECTRONIC DEVICE

(71) Applicant: Huawei Technologies Co., Ltd., Shenzhen (CN)

(72) Inventors: Chuanbo Shi, Shanghai (CN); Hanyang Wang, Reading (GB); Pengfei Wu, Shanghai (CN); Meng Hou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 18/575,561

(22) PCT Filed: Jun. 28, 2022

(86) PCT No.: PCT/CN2022/101754

§ 371 (c)(1),
(2) Date: Dec. 29, 2023

(87) PCT Pub. No.: WO2023/274192

PCT Pub. Date: Jan. 5, 2023

(65) Prior Publication Data

US 2024/0380113 A1 Nov. 14, 2024

(30) Foreign Application Priority Data

Jun. 30, 2021 (CN) ......................... 202110742500.2

(51) Int. Cl.

*H01Q 9/04* (2006.01)
*H01Q 1/24* (2006.01)
*H01Q 5/35* (2015.01)

(52) U.S. Cl.

CPC ............ *H01Q 9/045* (2013.01); *H01Q 1/242* (2013.01); *H01Q 5/35* (2015.01)

(58) Field of Classification Search

CPC .......... H01Q 9/045; H01Q 1/242; H01Q 5/35; H01Q 5/364

See application file for complete search history.

(56) References Cited

U.S. PATENT DOCUMENTS

| | | | | |
|---|---|---|---|---|
| 6,252,553 B1 | 6/2001 | Solomon | | |
| 2023/0232587 A1* | 7/2023 | Sun | H01Q 1/243 | 455/550.1 |

FOREIGN PATENT DOCUMENTS

| | | |
|---|---|---|
| CN | 107154528 B | 4/2020 |
| CN | 111628287 A | 9/2020 |
| CN | 112310631 A | 2/2021 |

OTHER PUBLICATIONS

Zhang Pu et al, "A compact and wideband microstrip antenna design with switchable pattern between conical and broadside beam," 2019 International Conference on Microwave and Millimeter Wave Technology (ICMMT), May 1, 2019, total 3 pages.

(Continued)

*Primary Examiner* — Dieu Hien T Duong
(74) *Attorney, Agent, or Firm* — Slater Matsil, LLP

(57) ABSTRACT

A microstrip antenna includes a radiator and a first feed and a second feed that are configured to feed a radio frequency signal, and a first feedpoint and two second feedpoints are disposed on the radiator. The first feedpoint is located at a central position of the radiator, and the first feedpoint is electrically connected to the first feed, and is configured to feed a radio frequency signal into the radiator, to excite the radiator to generate a $TM_{02}$ mode. The two second feedpoints deviate from the central position of the radiator and are spaced apart from the first feedpoint. The second feed is electrically connected to the second feedpoints through an adjustment circuit. The second feedpoints are configured to feed a radio frequency signal into the radiator, and the (Continued)

second feedpoints excite, by using the adjustment circuit, the radiator to generate a $TM_{10}$ mode.

20 Claims, 24 Drawing Sheets

(56) References Cited

OTHER PUBLICATIONS

Radavaram et al., "Wideband Radiation Reconfigurable Microstrip Patch Antenna Loaded With Two Inverted U-Slots", IEEE Transactions on Antennas and Propagation, IEEE, USA, vol. 67, No. 3, Mar. 1, 2019, total 8 pages.
Singh et al., "Low Cross-Polarization Improved-Gain Rectangular Patch Antenna", Electronics, vol. 8, No. 10, Oct. 18, 2019, total 13 pages.

* cited by examiner

MICROSTRIP ANTENNA AND ELECTRONIC DEVICE

CROSS-REFERENCE TO RELATED APPLICATIONS

This application is a National Stage of International Patent Application No. PCT/CN2022/101754, filed on Jun. 28, 2022, which claims priority to Chinese Patent Application No. 202110742500.2, filed on Jun. 30, 2021, both of which are hereby incorporated by reference in their entireties.

TECHNICAL FIELD

This application relates to the field of communication technologies, and in particular, to a microstrip antenna and an electronic device.

BACKGROUND

With development of communication technologies, an existing frame microstrip antenna of a mobile terminal cannot meet an increasingly high use requirement of a user, and an antenna needs to be disposed on a back of the mobile terminal. A common antenna is a one-dimensional antenna attached to a circuit board. Because there is no sufficient projection clearance on the back of the terminal and a height of the antenna is limited, radiation efficiency of the one-dimensional antenna is low. A two-dimensional microstrip antenna is a microstrip antenna that has advantages of high radiation efficiency and good communication performance, and can compensate for a radiation efficiency loss caused by an insufficient height of a one-dimensional antenna. However, an existing microstrip antenna SAR (Specific Absorption Ratio, specific absorption ratio, which indicates electromagnetic wave radiation energy absorbed by a unit material in a unit time) is high, which causes radiation damage to a user.

SUMMARY

This application provides a microstrip antenna, to resolve a technical problem of a high SAR value of an existing microstrip antenna.

This application further provides an electronic device.

The microstrip antenna provided in this application includes: a radiator and a first feed and a second feed that are configured to feed a radio frequency signal. A first feedpoint and two second feedpoints are disposed on the radiator. The first feedpoint is located at a central position of the radiator. The first feedpoint is electrically connected to the first feed, and is configured to feed a radio frequency signal into the radiator, to excite the radiator to generate a $TM_{02}$ mode. The two second feedpoints deviate from the central position of the radiator and are spaced apart from the first feedpoint. The second feed is electrically connected to the second feedpoints through an adjustment circuit. The second feedpoints are configured to feed a radio frequency signal into the radiator. The second feedpoints excite, by using the adjustment circuit, the radiator to generate a $TM_{10}$ mode, so that the radiator has performance of a dual-microstrip antenna. The first feed and the second feed are located on a circuit board of the electronic device.

In this embodiment, the first feedpoint and the second feedpoints are disposed on the radiator. The first feedpoint is located at a center of the radiator and has a symmetric structure. A magnetic field of the $TM_{02}$ mode is reversely canceled at the center of the radiator, so that two SAR hotspots are generated, a SAR value of a microstrip antenna is reduced, and radiation damage caused to a user by an electromagnetic wave is reduced. The $TM_{10}$ mode and the $TM_{02}$ mode share the same large-aperture radiator, so that a magnetic field generated by the $TM_{10}$ mode is dispersed, and a SAR value of the $TM_{10}$ mode is significantly reduced, to further reduce the radiation damage caused to a user by an electromagnetic wave generated by the microstrip antenna. In addition, the adjustment circuit is configured to feed a radio frequency signal into the radiator from the second feedpoints, to excite the radiator to generate a pure $TM_{10}$ mode, so that high isolation exists between an antenna formed by the first feedpoint and the radiator and an antenna formed by the second feedpoints and the radiator, to avoid signal interference that affects communication performance of the microstrip antenna.

In an implementation, the first feedpoint is configured to: feed a radio frequency signal into the radiator in a centrosymmetric feeding manner, and generate a current in a first direction on the radiator, and the second feedpoints are configured to: feed a radio frequency signal into the radiator in a distributed feeding manner, and generate a current in a second direction on the radiator, where the first direction is perpendicular to the second direction. In this embodiment, a radio frequency signal is fed into the radiator from the first feedpoint in the centrosymmetric feeding manner, so that a magnetic field generated on the radiator is reversely canceled at the center of the radiator, to reduce the SAR value of the microstrip antenna. A radio frequency signal is fed into the radiator from the second feedpoints in the distributed feeding manner, and the current in the second direction is generated on the radiator, so that currents of the $TM_{10}$ mode on two sides of the first direction are dispersed, and a magnetic field generated by the $TM_{10}$ mode is dispersed. In this way, the SAR value of the $TM_{10}$ mode is reduced significantly.

In an implementation, the radiator is rectangular, a size of the radiator in the first direction is three quarters to five quarters of a wavelength of an operating frequency band of the microstrip antenna, and a size of the radiator in the second direction is three eighths to five eighths of the wavelength of the operating frequency band of the microstrip antenna, where the first direction is a length direction of the radiator, and the second direction is a width direction of the radiator. A length and a width of the radiator may be changed, so that the microstrip antenna can cover different operating frequency bands.

In an implementation, the size of the radiator in the second direction is a half of the size of the radiator in the first direction. In this embodiment, when the size of the radiator in the second direction is a half of the size of the radiator in the first direction, an operating frequency band of the $TM_{02}$ mode is the same as an operating frequency band of the $TM_{10}$ mode.

In an implementation, the adjustment circuit includes a second capacitor, a third capacitor, and a microstrip that are electrically connected to the radiator, the second capacitor and the third capacitor are spaced apart in the second direction, the second capacitor and the third capacitor are electrically connected to the second feedpoints, a straight-line length of the microstrip is a half of a wavelength of an operating frequency band of an antenna formed by the second feedpoints and the radiator, and the microstrip is connected between the second capacitor and the third capacitor and generates a 180-degree phase difference. In this embodiment, the adjustment circuit is configured to feed a radio frequency signal into the radiator from the second feedpoints, to excite the radiator to generate a pure $TM_{10}$ mode, so that high isolation exists between an antenna formed by the first feedpoint and the radiator and an antenna formed by the second feedpoints and the radiator, to avoid signal interference that affects communication performance of the microstrip antenna.

In an implementation, the adjustment circuit includes a balanced/unbalanced converter, and the balanced/unbalanced converter is connected to the radiator and the second feedpoints to form a 180-degree phase difference. In this embodiment, the adjustment circuit performs differential feeding on the second feedpoints by using the balanced/unbalanced converter, so that the radiator generates a pure $TM_{10}$ mode.

In an implementation, the adjustment circuit includes a phase shifter, and the phase shifter is connected to the radiator and the second feedpoints to form a 180-degree phase difference. In this embodiment, the adjustment circuit performs differential feeding on the second feedpoints by using the phase shifter, so that the radiator generates a pure $TM_{10}$ mode, to simplify a structure of the adjustment circuit.

In an implementation, the two second feedpoints and the first feedpoint are disposed side by side in the second direction, and the two second feedpoints are distributed on two opposite sides of the first feedpoint symmetrically with respect to the first feedpoint; or the two second feedpoints are offset relative to the central position of the radiator in both the first direction and the second direction, and the two second feedpoints pass through the first feedpoint along a symmetry axis in the first direction. When the second radio frequency signal is fed into the radiator from the second feedpoints, the radiator may be excited to generate $TM_{10}$.

In an implementation, the two second feedpoints are offset relative to the central position of the radiator in both the first direction and the second direction and are spaced apart from the first feedpoint. In this embodiment, positions of the second feedpoints on the radiator are asymmetric in the second direction, and the radiator may be excited to generate $TM_{10}$. The positions of the second feedpoints on the radiator are asymmetric in the first direction, and the radiator may be excited to generate $TM_{01}$. In addition, the second feedpoints deviate from the center of the radiator in both the first direction and the second direction, and the radiator may be excited to generate a $TM_{11}$ high-order mode.

In an implementation, the second feedpoints are offset relative to the central position of the radiator in both the first direction and the second direction and are spaced apart from the first feedpoint, and the second feedpoints are further configured to feed a radio frequency signal into the radiator, to excite the radiator to generate a $TM_{01}$ mode and a $TM_{11}$ mode. In this embodiment, the second feedpoints are disposed to be offset relative to the central position of the radiator in both the first direction and the second direction. When a radio frequency signal is fed into the radiator from the second feedpoints, the radiator may be excited to generate a $TM_{10}$ mode, a $TM_{01}$ mode, and a $TM_{11}$ mode, to save feedpoints and increase a radiation frequency band range of the microstrip antenna.

In an implementation, a first matching circuit is connected between the first feedpoint and the first feed, the first matching circuit includes a first capacitor and a first inductor that are connected in series, the first capacitor is electrically connected to the first feedpoint, and the first inductor is electrically connected to the first feed; or the first matching circuit includes a first inductor, and the first inductor is electrically connected to the feed and the first feedpoint.

In an implementation, the microstrip antenna further includes a third feedpoint, a third feed, and a third matching circuit, the third feedpoint is disposed on the radiator, deviates from the central position of the radiator in the first direction, and is spaced apart from the first feedpoint, the third matching circuit is electrically connected to the third feedpoint and the third feed, and the third feedpoint is configured to feed a radio frequency signal into the radiator, to excite the radiator to generate a $TM_{01}$ mode. In this embodiment, the third feedpoint, the first feedpoint, and the second feedpoints share one radiator, so that space can be further saved and utilization efficiency of the radiator can be improved.

In an implementation, the third matching circuit includes a third inductor, where one end of the third inductor is electrically connected to the third feed, and the other end is electrically connected to the third feedpoint; and the third matching circuit is configured to feed a signal into the radiator through the third feedpoint. In this embodiment, a radio frequency signal is fed into the radiator through the third feedpoint by using the third matching circuit, and the radiator is excited to generate a low-hotspot $TM_{01}$ mode.

In an implementation, a through groove is provided in the radiator, a length of the through groove extends in the second direction, and the through groove is provided in the first direction and spaced apart from the first feedpoint. In this embodiment, the through groove extending in the second direction is provided in the radiator, so that the size of the radiator in the first direction can be reduced, to facilitate miniaturization of the microstrip antenna.

In an implementation, two through grooves are provided, and the two through grooves are symmetrically disposed with respect to a center of the radiator. In this embodiment, the two symmetric through grooves are disposed, so that the size of the radiator in the first direction X can be further shortened.

In an implementation, an electrical length of the radiator in the first direction is equal to a wavelength of an operating frequency band of the microstrip antenna, and an electrical length of the radiator in the second direction is a half of the wavelength of the operating frequency band of the microstrip antenna.

In an implementation, an operating frequency band of the $TM_{02}$ mode is the same as an operating frequency band of the $TM_{10}$ mode.

In an implementation, the second feedpoints are located at a central position of the radiator in the first direction, and positions of the second feedpoints on the radiator are symmetric in the first direction.

In an implementation, the third feedpoint is located at a central position of the radiator in the second direction, and positions of the third feedpoints on the radiator are symmetric in the second direction.

In an implementation, capacities of both the second capacitor and the third capacitor are 0.6 pF, and impedance of the microstrip is 50 ohms.

This application provides an electronic device, including a circuit board and the microstrip antenna, and a radiator of the microstrip antenna is electrically connected to the circuit board. In this embodiment, a radio frequency module may be disposed on the circuit board. The radio frequency module generates a radio frequency signal, and transmits the radio frequency signal to the microstrip antenna. The microstrip antenna is configured to: transmit and receive a signal, and communicate with the outside.

In an implementation, the radiator is mounted on a back of the circuit board; or the electronic device includes an antenna support, and the radiator is disposed on the antenna support; or the electronic device includes a rear cover, and the radiator is disposed on the rear cover. A mounting position of the radiator may be adjusted according to a mounting environment, to increase application scenarios of the microstrip antenna.

In summary, in this application, the first feedpoint and the two second feedpoints are disposed on the radiator. The first feedpoint is located at a center of the radiator and has a symmetric structure. A magnetic field of the $TM_{02}$ mode is reversely canceled at the center of the radiator, so that two SAR hotspots are generated, a SAR value of a microstrip antenna is reduced, and radiation damage caused to a user by an electromagnetic wave is reduced. The $TM_{10}$ mode and the $TM_{02}$ mode share the same large-aperture radiator, so that currents of the $TM_{10}$ mode on two sides of the first direction X are dispersed, a magnetic field generated by the $TM_{10}$ mode is dispersed, and a SAR value of the $TM_{10}$ mode is significantly reduced, to further reduce the radiation damage caused to a user by an electromagnetic wave generated by the microstrip antenna. In addition, the adjustment circuit is configured to feed a radio frequency signal into the radiator from the second feedpoints, to excite the radiator to generate a pure $TM_{10}$ mode, so that high isolation exists between an antenna formed by the first feed, the first feedpoint, and the radiator and an antenna formed by the second feed, the second feedpoints, and the radiator, to avoid signal interference that affects communication performance of the microstrip antenna.

BRIEF DESCRIPTION OF THE DRAWINGS

To describe technical solutions in embodiments of this application or in the background more clearly, the following describes accompanying drawings used in embodiments of this application or in the background.

DETAILED DESCRIPTION OF ILLUSTRATIVE EMBODIMENTS

Figure 1:
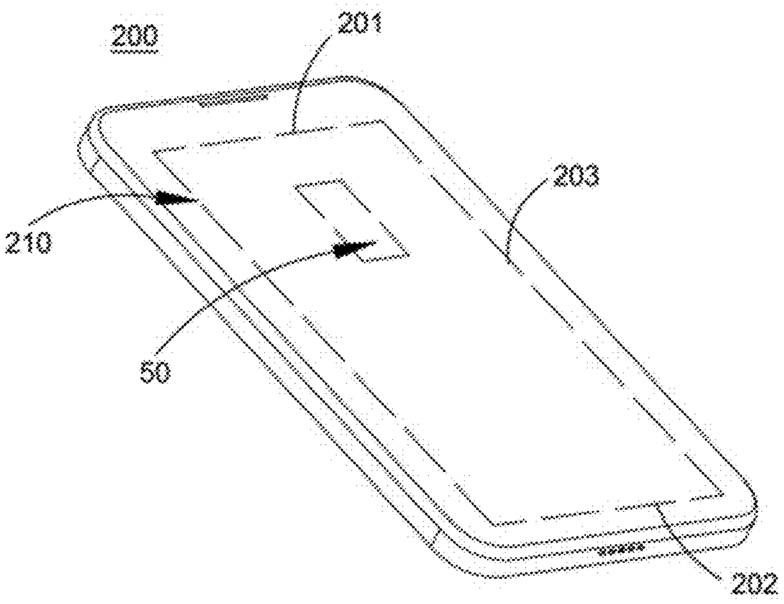
FIG. 1 is a schematic diagram of a structure of an electronic device according to an embodiment of this application.

A SAR (Specific Absorption Ratio, electromagnetic wave absorption ratio) indicates electromagnetic radiation energy absorbed by a material of a unit mass in a unit time. A SAR value indicates heat energy generated by electromagnetic waves in electronic products such as mobile phones, and is data used to measuring impact on a human body. A larger SAR value indicates that the electronic device causes more radiation damage to the human body, and a smaller SAR value indicates that the electronic device causes less radiation damage to the human body. Therefore, it is necessary to reduce the SAR value of the electronic device.

This application provides a microstrip antenna and an electronic device. The microstrip antenna includes a radiator and a first feed and a second feed that are configured to feed a radio frequency signal. A first feedpoint and two second feedpoints are disposed on the radiator. The first feedpoint is located at a central position of the radiator, and the first feedpoint is electrically connected to the first feed, and is configured to feed a radio frequency signal into the radiator, to excite the radiator to generate a $TM_{02}$ mode. The two second feedpoints deviate from the central position of the radiator and are spaced apart from the first feedpoint. The second feed is electrically connected to the second feedpoints through an adjustment circuit. The second feedpoints are configured to feed a radio frequency signal into the radiator, and the second feedpoints excite, by using the adjustment circuit, the radiator to generate a $TM_{10}$ mode, so that the radiator has performance of a dual-microstrip antenna. The electronic device includes a circuit board and the microstrip antenna, and a radiator of the microstrip antenna is electrically connected to the circuit board. The radiator is mounted on a back of the circuit board; or the electronic device includes an antenna support, and the radiator is disposed on the antenna support; or the electronic device includes a rear cover, and the radiator is disposed on the rear cover.

The first feedpoint is configured to: feed a radio frequency signal into the radiator in a centrosymmetric feeding manner, and generate a current in a first direction on the radiator, and the two second feedpoints are configured to: feed a radio frequency signal into the radiator in a distributed feeding manner, and generate a current in a second direction on the radiator, where the first direction is perpendicular to the second direction.

The radiator is rectangular, a size of the radiator in the first direction is three quarters to five quarters of a wavelength of an operating frequency band of the microstrip antenna, a size of the radiator in the second direction is three eighths to five eighths of the wavelength of the operating frequency band of the microstrip antenna, the first direction is a length direction of the radiator, and the second direction is a width direction of the radiator.

In this application, the first feedpoint is located at a center of the radiator and has a symmetric structure. A magnetic field of the $TM_{02}$ mode is reversely canceled at the center of the radiator, so that two SAR hotspots are generated, a SAR value of a microstrip antenna is reduced, and radiation damage caused to a user by an electromagnetic wave is reduced. The $TM_{10}$ mode and the $TM_{02}$ mode share the same large-aperture radiator, so that a magnetic field generated by the $TM_{10}$ mode is dispersed, and a SAR value of the $TM_{10}$ mode is significantly reduced, to further reduce the radiation damage caused to a user by an electromagnetic wave generated by the microstrip antenna. In addition, the adjustment circuit is configured to feed a radio frequency signal into the radiator from the second feedpoints, to excite the radiator to generate a pure $TM_{10}$ mode, so that high isolation exists between an antenna formed by the first feedpoint and the radiator and an antenna formed by the second feedpoints and the radiator, to avoid signal interference that affects communication performance of the microstrip antenna.

The following describes embodiments of this application with reference to the accompanying drawings in embodiments of this application.

Refer to FIG. 1. In this embodiment, an electronic device 200 is a mobile phone. In another embodiment, the electronic device 200 may be a tablet computer (tablet personal computer), a laptop computer (laptop computer), a personal digital assistant (personal digital assistant, PDA), a wearable device (wearable device), or the like. In this embodiment, a microstrip 100 is mounted on the circuit board 210. A radio frequency module is disposed on the circuit board 210. The radio frequency module generates a radio frequency signal, and transmits the radio frequency signal to the microstrip antenna 100. The microstrip antenna 100 is configured to transmit and receive a signal, and communicate with the outside.

In this embodiment, the circuit board 210 is rectangular. The circuit board 210 includes a top side 201 and a bottom side 202 opposite to the top side 201 in a long-side direction, and includes two opposite lateral sides 203 in the long-side direction. The top side 201, the bottom side 202, and the two lateral sides 203 jointly form four sides of the circuit board 210, and a radiator 50 is mounted on the circuit board 210.

In another embodiment, the electronic device 200 may further include an antenna support, and the radiator 50 is disposed on the antenna support. Specifically, the antenna support may be a flexible circuit board 210, or may be a laser shaped circuit board 210 (LDS). Alternatively, the electronic device 200 includes a rear cover, and the radiator 50 is disposed on the rear cover. Specifically, the radiator 50 may be directly bonded to the rear cover. Alternatively, when the rear cover is made of a glass material, the radiator 50 may be integrated into the rear cover to make a glass antenna, to further save space. A mounting position of the radiator may be adjusted according to a mounting environment, to increase application scenarios of the microstrip antenna.

The following describes the microstrip antenna 100 by using specific embodiments.

Figure 2:
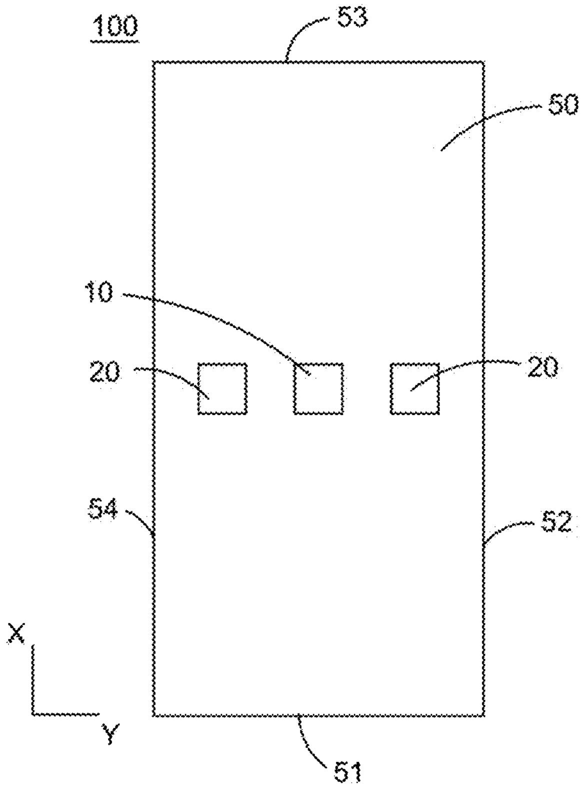
FIG. 2 is a schematic diagram of a structure of a microstrip antenna according to an embodiment of this application.
Figure 4:
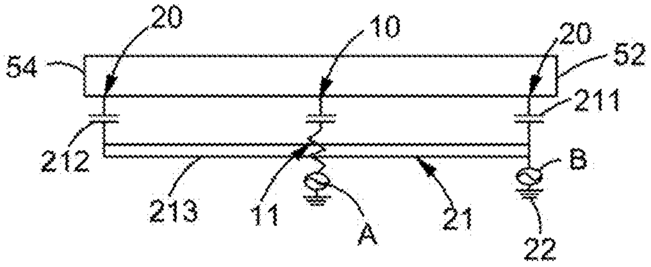
FIG. 4 is a schematic diagram of a structure of the microstrip antenna shown in FIG. 2 from another viewing angle.

Refer to FIG. 2. The microstrip antenna 100 includes a radiator 50 and a first feed A and a second feed B (as shown in FIG. 4) that are configured to feed a radio frequency signal. In this embodiment, the radiator 50 is a metal patch. For ease of description, a length direction of the radiator 50 is defined as a first direction X, a width direction of the radiator 50 is defined as a second direction Y, and the first direction X is perpendicular to the second direction Y. A first feedpoint 10 and two second feedpoints 20 are disposed on the radiator 50. The first feedpoint 10 is located at a central position of the radiator 50, and the first feedpoint 10 is electrically connected to the first feed A, and is configured to feed a radio frequency signal into the radiator 50, to excite the radiator 50 to generate a $TM_{02}$ mode. The two second feedpoints 20 deviate from the central position of the radiator 50 in the second direction Y and are spaced apart from and side by side with the first feedpoint 10 in the second direction Y. The second feed B is electrically connected to the second feedpoints 20 through an adjustment circuit 21 (as shown in FIG. 4). The second feedpoints 20 are configured to feed a radio frequency signal into the radiator 50, and the second feedpoints 20 excite, by using the adjustment circuit 21, the radiator 50 to generate a $TM_{10}$ mode, so that the radiator 50 has performance of a dual-microstrip antenna.

The microstrip antenna 100 may be used in a low-frequency dual antenna, a medium-high frequency dual antenna, an N77/N79 band dual antenna, a medium-high frequency and Wi-Fi dual antenna, a Wi-Fi and Bluetooth dual antenna, and the like. The microstrip antenna 100 may be a linear antenna, a loop antenna, a slot antenna, or the like.

In this application, the first feedpoint 10 and the second feedpoints 20 share one radiator 50, to save space. A radio frequency signal is fed into the radiator 50 from the first feedpoint 10, a current in the first direction X is generated on the radiator 50, and the radiator 50 is excited to generate a $TM_{02}$ mode. The first feedpoint 10 is located at a center of the radiator 50 and has a symmetric structure. A magnetic field of the $TM_{02}$ mode is reversely canceled at the center of the radiator 50, so that two SAR hotspots are generated, a SAR value of a microstrip antenna 100 is reduced, and radiation damage caused to a user by an electromagnetic wave is reduced. A radio frequency signal is fed into the radiator 50 from the second feedpoints 20, a current in the second direction Y is generated on the radiator 50, and the radiator 50 is excited to generate a $TM_{10}$ mode. The $TM_{10}$ mode and the $TM_{02}$ mode share the same large-aperture radiator 50, so that currents of the $TM_{10}$ mode on two sides of the first direction X are dispersed, a magnetic field generated by the $TM_{10}$ mode is dispersed, and a SAR value of the $TM_{10}$ mode is significantly reduced, to further reduce the radiation damage caused to a user by an electromagnetic wave generated by the microstrip antenna 100. In addition, the adjustment circuit 21 is configured to feed a radio frequency signal into the radiator 50 from the second feedpoints 20, to excite the radiator 50 to generate a pure $TM_{10}$ mode, so that high isolation exists between an antenna formed by the first feedpoint 10 and the radiator 50 and an antenna formed by the second feedpoints 20 and the radiator 5, to avoid signal interference that affects communication performance of the microstrip antenna 100.

In an embodiment, specifically, refer to FIG. 2. The radiator 50 is a rectangular metal patch. The radiator 50 includes a first side 51 and a third side 53 that are disposed opposite to each other, and a second side 52 and a fourth side 54 that are disposed opposite to each other. The first side 51 and the third side 53 extend in the first direction X, and the second side 52 and the fourth side 54 extend in the second direction Y. The first direction X is the length direction of the radiator 50, and the second direction Y is the width direction of the radiator 50.

In an implementation, a size of the radiator 50 in the first direction X (that is, a length of the radiator 50) is three quarters to five quarters of a wavelength of an operating frequency band of the microstrip antenna 100. A size of the radiator 50 in the second direction Y (that is, a width of the radiator 50) is three eighths to five eighths of the wavelength of the operating frequency band of the microstrip antenna 100. A length and a width of the radiator 50 may be changed, so that the microstrip antenna 100 can cover different operating frequency bands. Specifically, the length of the radiator 50 is equal to the wavelength of the operating frequency band of the microstrip antenna 100, and the width of the radiator 50 is a half of the wavelength of the operating frequency band of the microstrip antenna 100. In this implementation, the size of the radiator 50 in the first direction X is a half of the size of the radiator 50 in the second direction Y.

Figure 3:
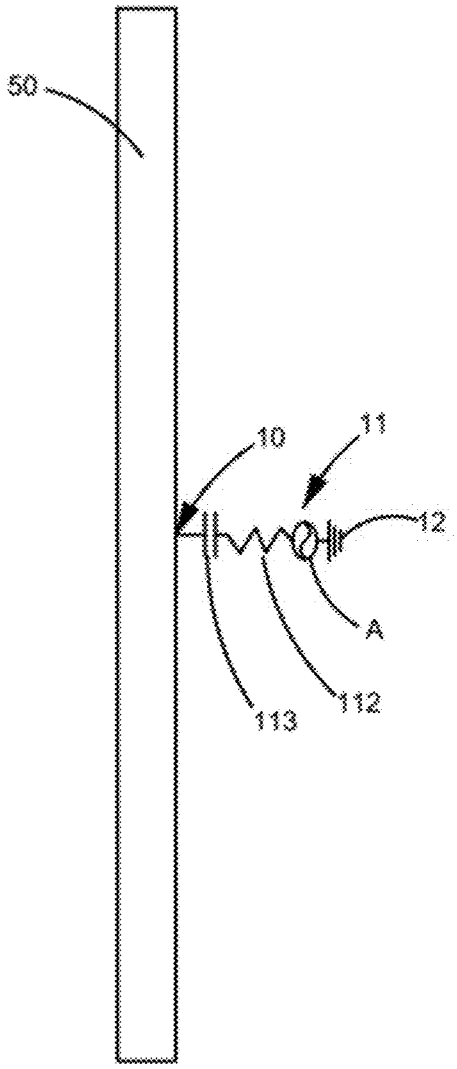
FIG. 3 is a schematic diagram of a structure of the microstrip antenna shown in FIG. 2 from another viewing angle.

Refer to FIG. 2 and FIG. 3. The first feedpoint 10 is located at the center of the radiator 50, that is, the first feedpoint 10 is located at both a center in the first direction X and a center in the second direction Y. The microstrip antenna 100 further includes a first matching circuit 11. The first matching circuit 11 is connected between the first feed A and the first feedpoint 10. The first matching circuit 11 feeds a radio frequency signal from the first feedpoint 10 into the radiator 50 in a central feeding manner, generates, on the radiator 50, currents that respectively flow from the first feedpoint 10 toward the second side 52 and the fourth side 54 in the first direction X, and excites the radiator 50 to generate the $TM_{02}$ mode. In addition, because the first feedpoint 10 is located at the central position of the radiator 50, the radiator 50 may be suppressed from generating a $TM_{01}$ mode and the $TM_{10}$ mode, so that the radiator 50 generates a pure $TM_{02}$ high-order mode.

Refer to FIG. 3. In an implementation, the first matching circuit 11 includes a first inductor 112 and a first capacitor 113 that are connected in series. Two ends of the first inductor 112 are electrically connected to the first capacitor 113 and the first feed A respectively, an end of the first capacitor 113 away from the first inductor 112 is electrically connected to the first feedpoint 10, and the first feed A is further electrically connected to the radio frequency module. A radio frequency signal generated by the radio frequency module is first transmitted to the first feed A, then transmitted from the first feed A to the first inductor 112, then transmitted from the first inductor 112 to the first capacitor 113, and then fed into the radiator 50 from the first capacitor 113 through the first feedpoint 10. The first matching circuit 11 further includes a first ground point 12, the first ground point 12 is electrically connected to the first feed A, and the first ground point 12 is configured to be grounded.

In another implementation, the first matching circuit 11 includes the first inductor 112. One end of the first inductor 112 is electrically connected to the first feedpoint 10, and the other end is electrically connected to the first feed A. The first feed A is further electrically connected to the radio frequency module. A radio frequency signal generated by the radio frequency module is first transmitted to the first feed A, then transmitted from the first feed A to the first inductor 112, and then directly fed from the first inductor 112 into the radiator 50 through the first feedpoint 10.

Refer to FIG. 2 and FIG. 4. Two second feedpoints 20 are provided. The two second feedpoints 20 and the first feedpoint 10 are arranged side by side in the second direction Y, and the two second feedpoints 20 are symmetrically distributed on two opposite sides of the first feedpoint 10 with respect to the first feedpoint 10. One second feedpoint 20 is located between the first feedpoint 10 and the second side 52, and the other second feedpoint 20 is located between the first feedpoint 10 and the fourth side 54. In addition, both the two second feedpoints 20 are located at a central position of the radiator 50 in the first direction X, and positions of the second feedpoints 20 in the radiator 50 are asymmetric in the second direction Y. The adjustment circuit 21 feeds a radio frequency signal from the second feedpoints 20 into the radiator 50 in a distributed feeding manner, and generates the current in the second direction Y on the radiator 50, to excite the radiator 50 to generate the $TM_{10}$ mode.

In an implementation, the adjustment circuit 21 includes a second capacitor 211, a third capacitor 212, and a microstrip 213 that are electrically connected to the radiator 50. The second capacitor 211 and the third capacitor 212 are spaced apart in the second direction Y. The second capacitor 211 is electrically connected to the second feedpoint 20 located between the first feedpoint 10 and the second side 52, and the third capacitor 212 is electrically connected to the second feedpoint 20 located between the first feedpoint 10 and the fourth side 54. The microstrip 213 is connected between the second capacitor 211 and the third capacitor 212. The second feed B is electrically connected to both the microstrip 213 and the second capacitor 211, and the second feed B is further electrically connected to the radio frequency module. A radio frequency signal generated by the radio frequency module is first transmitted to the second feed B, one part of the radio frequency signal flowing through the second feed B is fed into the radiator 50 through the second capacitor 211 and the second feedpoint 20 located between the first feedpoint 10 and the second side 52, and the other part of the radio frequency signal flowing through the second feed B is fed into the radiator 50 through the microstrip 213, the third capacitor, and the second feedpoint 20 located between the first feedpoint 10 and the fourth side 54. The microstrip 213 has a function of changing a phase difference between radio frequency signals, so that a 180-degree phase difference is generated between signals flowing through the second capacitor 211 and the third capacitor 212, and a 180-degree phase difference is generated between a signal fed from the second feedpoint 20 between the first feedpoint 10 and the second side 52 and a signal fed from the second feedpoint 20 between the first feedpoint 10 and the fourth side 54. In this embodiment, the adjustment circuit 21 is configured to feed a radio frequency signal into the radiator 50 from the second feedpoints 20, to excite the radiator 50 to generate a pure $TM_{10}$ mode, so that high isolation exists between the antenna formed by the first feedpoint 10 and the radiator 50 and the antenna formed by the second feedpoints 20 and the radiator 50, to avoid signal interference that affects communication performance of the microstrip antenna 100. Impedance of the microstrip 213 is 50 ohms, and a straight-line length of the microstrip 213 is a half of a wavelength of an operating frequency band of the microstrip antenna 100 formed by the second feedpoints 20 and the radiator 50. The adjustment circuit 21 further includes a second ground point 22, the second ground point 22 is electrically connected to the microstrip 213, and the second ground point 22 is configured to be grounded.

In another implementation, the adjustment circuit 21 includes a balanced/unbalanced converter, and the balanced/unbalanced converter is connected to the radiator 50 and the second feedpoints 20 to form a 180-degree phase difference. Specifically, one end of the balanced/unbalanced converter is connected to an electrical connection point 55 on the radiator 50, and the other end is electrically connected to the second feedpoints 20. The adjustment circuit 21 performs differential feeding on the second feedpoints 20 by using the balanced/unbalanced converter, so that the radiator 50 generates the pure $TM_{10}$ mode.

In an implementation, the adjustment circuit 21 may include a phase shifter, and the phase shifter is connected to the radiator 50 and the second feedpoints 20 to form a 180-degree phase difference. Specifically, one end of the phase shifter is connected to an electrical connection point 55 on the radiator 50, and the other end is electrically connected to the second feedpoints 20. The adjustment circuit 21 performs differential feeding on the second feedpoints 20 by using the phase shifter, so that the radiator 50 generates a pure $TM_{10}$ mode, to simplify a structure of the adjustment circuit 21.

Figure 5:
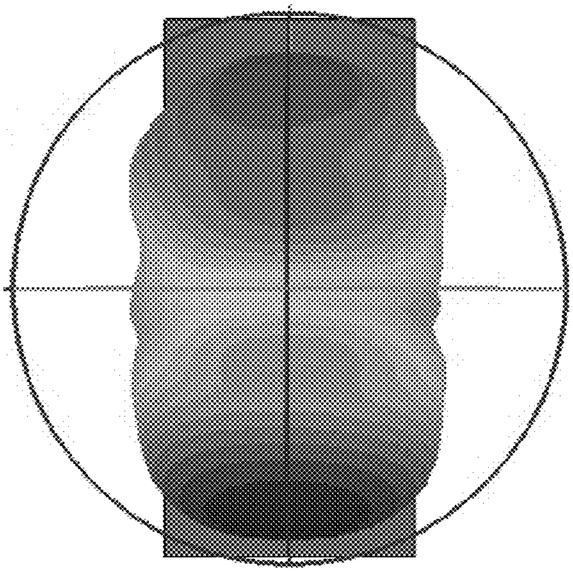
FIG. 5 is a magnetic field direction diagram of a TM02 mode of the microstrip antenna shown in FIG. 2.
Figure 6:
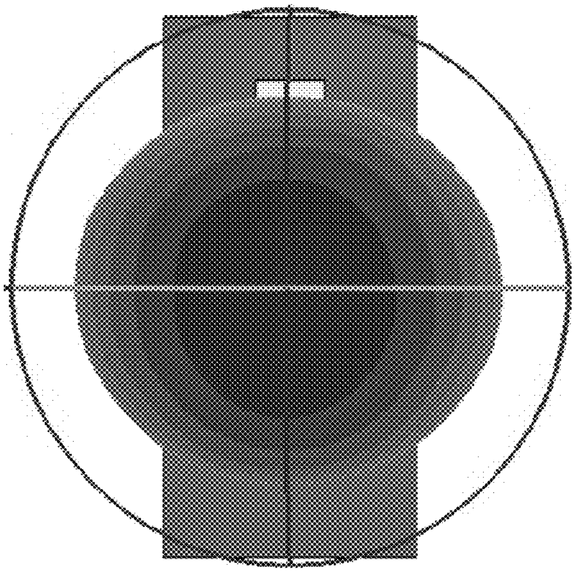
FIG. 6 is a magnetic field direction diagram of a TM10 mode of the microstrip antenna shown in FIG. 2.

Refer to FIG. 5 and FIG. 6. A radiation pattern of the $TM_{02}$ mode that is generated by the radiator 50 excited by the first feedpoint 10 is Monopolar, and a radiation pattern of the $TM_{10}$ mode that is generated by the radiator 50 excited by the second feedpoints 20 is Broadside. Radiation directions of the $TM_{02}$ mode and the $TM_{10}$ mode have good complementary characteristics, so that the microstrip antenna 100 has better radiation performance in a plurality of directions, and communication performance of the microstrip antenna 100 is improved.

Figure 7:
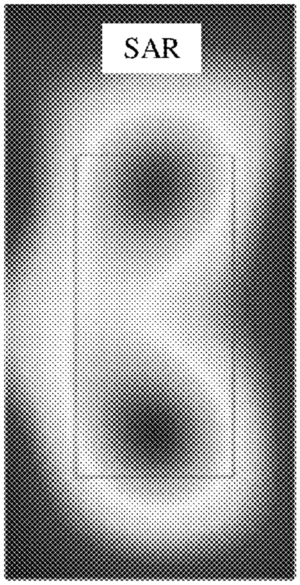
FIG. 7 is a hotspot distribution diagram of a TM02 mode of the microstrip antenna shown in FIG. 2.
Figure 8:
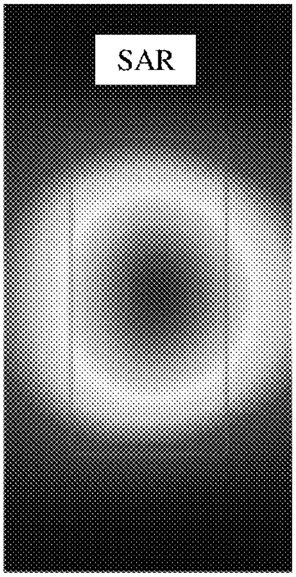
FIG. 8 is a hotspot distribution diagram of a TM10 mode of the microstrip antenna shown in FIG. 2.

Refer to FIG. 7. The $TM_{02}$ mode generates a dual-SAR hotspot on the radiator, which can effectively reduce the SAR value of the microstrip antenna 100. Refer to FIG. 8. A hotspot of the $TM_{10}$ mode diffuses from the center of the radiator to a surrounding area, so that the SAR value of the $TM_{10}$ mode is significantly reduced.

Figure 9:
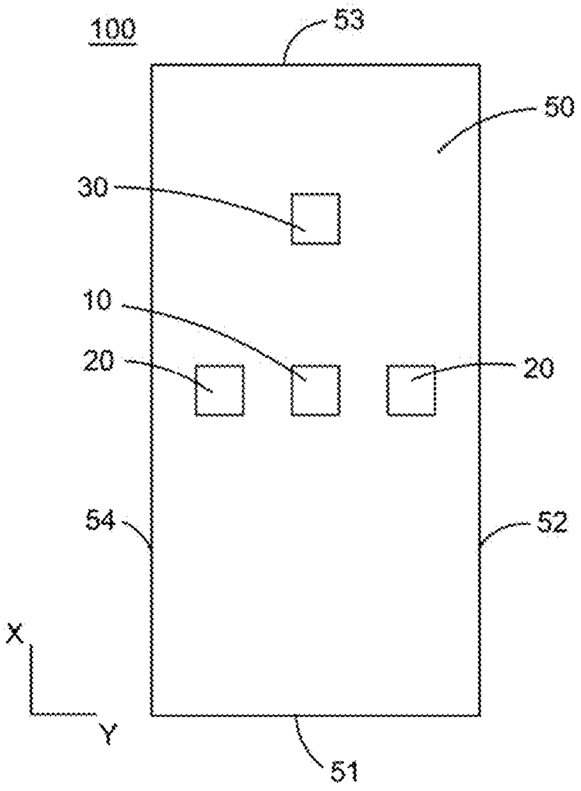
FIG. 9 is a schematic diagram of a structure of a microstrip antenna according to an embodiment of this application.
Figure 10:
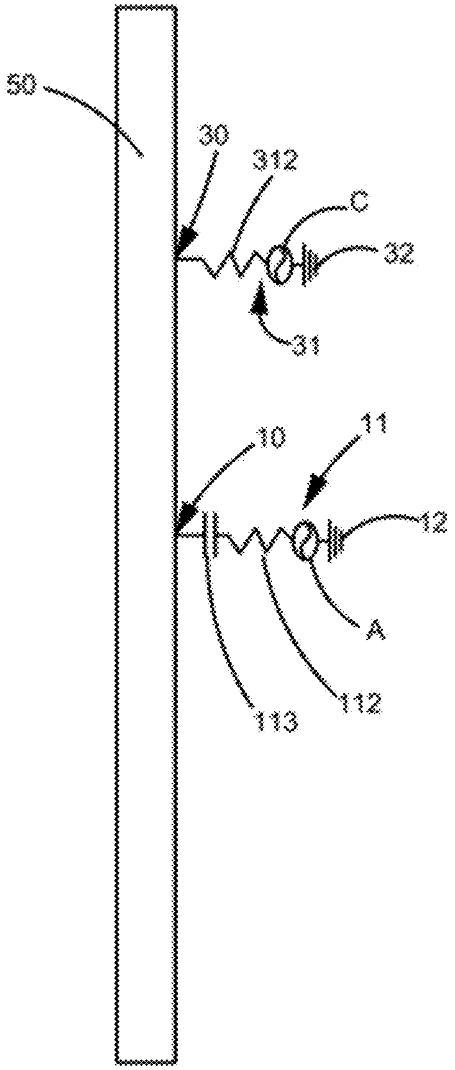
FIG. 10 is a schematic diagram of a structure of the microstrip antenna shown in FIG. 9 from another viewing angle.

Refer to FIG. 9 and FIG. 10. The microstrip antenna 100 further includes a third feedpoint 30 and a third feed C. The third feedpoint 30 is disposed on the radiator 50, deviates from the central position of the radiator 50 in the first direction X, and is spaced apart from the first feedpoint 10. In another implementation, the third feedpoint 30 may deviate from the center of the radiator 50 in the first direction X toward the second side 52. The third feedpoint 30 is electrically connected to the third feed C, and is configured to feed a radio frequency signal into the radiator 50, to excite the radiator 50 to generate the $TM_{01}$ mode. The third feedpoint 30, the first feedpoint 10, and the second feedpoints 20 share one radiator 50, so that space can be further saved and utilization efficiency of the radiator 50 can be improved. A resonance of the $TM_{01}$ mode generated by an antenna formed by the third feedpoint 30 and the radiator 50 is close to 2.15 GHz, and the radiator 50 is not electrically large in size relative to a resonance point of the $TM_{01}$ mode, and has a high SAR value. In this embodiment, the $TM_{01}$ mode is configured to receive a signal, so that the antenna formed by the third feedpoint 30 and the radiator 50 does not increase the SAR value of the microstrip antenna 100 while performing communication.

The microstrip antenna 100 further includes a third matching circuit 31, and the third matching circuit 31 includes a third inductor 312. An end of the third feed Cis electrically connected to one end of the third inductor 312, and the other end of the third inductor 312 is electrically connected to the third feedpoint 30. The third feed C is further electrically connected to the radio frequency module. A radio frequency signal generated by the radio frequency module is transmitted to the third inductor 312 through the third feed C, and then fed into the radiator 50 from the third feedpoint 30 through the third inductor 312. A current in the first direction X is generated on the radiator 50, and the radiator 50 is excited to generate a $TM_{01}$ mode.

Figure 11:
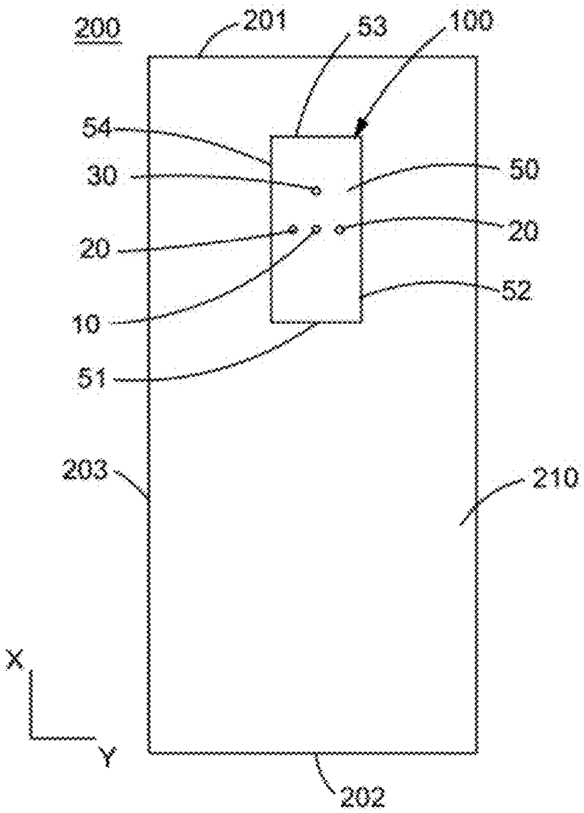
FIG. 11 is a partial schematic diagram of a structure of an electronic device having the microstrip antenna shown in FIG. 9.

Refer to FIG. 11. In a specific embodiment, a size of a long side of the circuit board 210 is 155 mm, and a size of a short side of the circuit board is 72 mm. The length of the radiator 50 is 41 mm, and the width of the radiator is 20 mm. The width of the radiator 50 is close to a half of the length, and is within a tolerance range. The radiator 50 is mounted on the circuit board 210, and the second side 52 and the fourth side 54 of the radiator 50 are parallel to the top side 201 and the bottom side 202 of the circuit board 210. The first side 51 and the third side 53 of the radiator 50 are parallel to the two lateral sides 203 of the circuit board 210. A height between the radiator 50 and the circuit board 210 is 2 mm, and a distance between the fourth side 54 and the top side 201 is 18 mm. The first feedpoint 10 is located at the center of the radiator 50, that is, the first feedpoint 10 is located at both the center in the first direction X and the center in the second direction Y. The two second feedpoints 10 are symmetrically distributed on two opposite sides of the first feedpoint 10 with respect to the first feedpoint 10, and distances between the two second feedpoints 20 and the first feedpoint 10 are both 9 mm. The third feedpoint 30 deviates from the center of the radiator 50 by 10 mm in the first direction X toward the fourth side 54, and the third feedpoint 30 is located at a central position of the radiator 50 in the second direction Y. As shown in FIG. 4 and FIG. 8, a capacity of the first capacitor 113 is 0.2 pF, and an inductance of the first inductor 112 is 8.2 nH. A capacity of the second capacitor 211 and a capacity of the third capacitor 212 are both 0.6 pF, and the impedance of the microstrip 213 is 50 ohms. An inductance of the third inductor 312 is 1.2 nH. The first feedpoint 10, the first feed A, the first matching circuit 11, and the radiator 50 form a first antenna, the second feedpoints 20, the second feed B, the adjustment circuit 21, and the radiator 50 form a second antenna, and the third feedpoint 30, the third feed C, the third matching circuit 31, and the radiator 50 form a third antenna.

Figure 12:
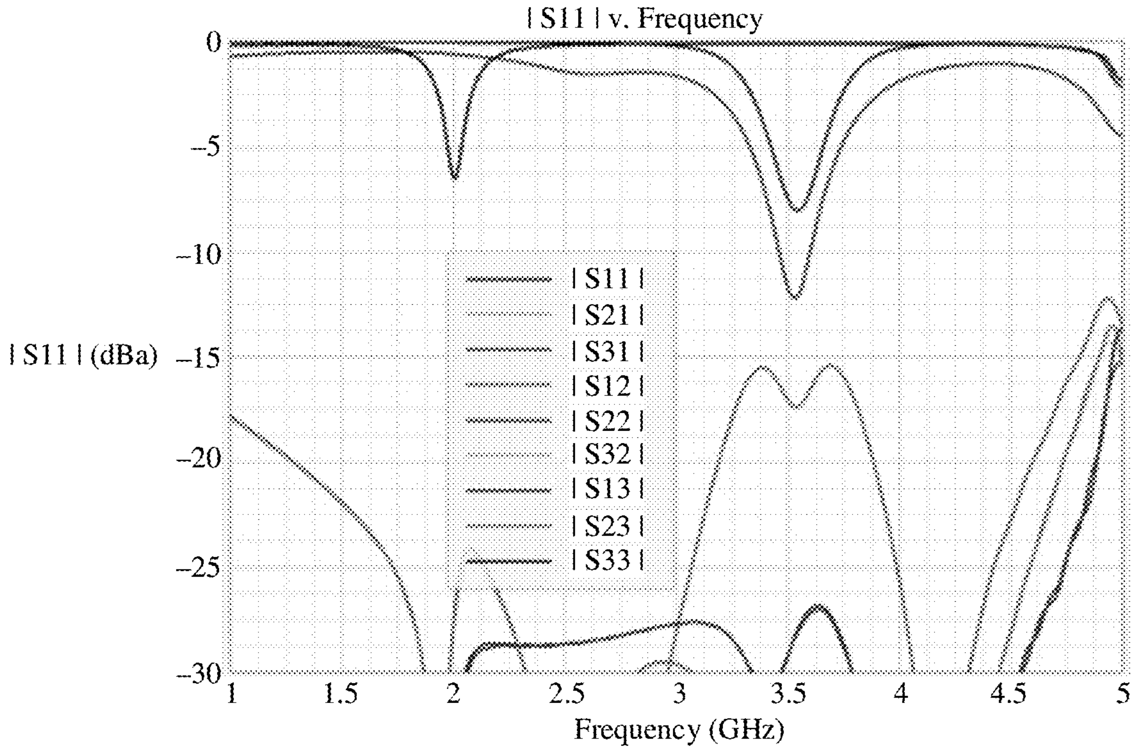
FIG. 12 is an S parameter diagram of the microstrip antenna shown in FIG. 9.

Refer to FIG. 12. S11 is an S parameter curve of the first antenna, S22 is an S parameter curve of the second antenna, and S33 is an S parameter curve of the third antenna. Resonance frequencies of the first antenna and the second antenna are both 3.55 GHZ, and a resonance frequency of the third antenna is 2.15 GHz. S21 and S12 are S parameter curves of a dual antenna formed by the first antenna and the second antenna. When a frequency is close to 3.55 GHz, that is, operating frequency bands of the first antenna and the second antenna, a gain of the dual antenna formed by the first antenna and the second antenna is greater than 17 dB, and isolation between the first antenna and the second antenna is high. S31 and S13 are S parameter curves of a dual antenna formed by the first antenna and the third antenna. When a frequency is 3.55 GHz, a gain of the dual antenna formed by the first antenna and the third antenna is greater than 26 dB, and isolation between the first antenna and the third antenna is high when an operating frequency is 3.55 GHz. In addition, when the frequency is 2.15 GHz, the gain of the dual antenna formed by the first antenna and the third antenna is also large, and isolation between the first antenna and the third antenna is high when the operating frequency is 2.15 GHz. S23 and S32 are S parameter curves of a dual antenna formed by the second antenna and the third antenna. When the frequencies are 3.55 GHz and 2.15 GHz, a gain of the dual antenna formed by the second antenna and the third antenna is large, and isolation between the second antenna and the third antenna is high when the operating frequency is 2.15 GHz and 3.55 GHz. High isolation between every two of the first antenna, the second antenna, and the third antenna ensures that the first antenna, the second antenna, and the third antenna do not interfere with each other when operating simultaneously, so that communication performance of the microstrip antenna 100 is improved.

Figure 13:
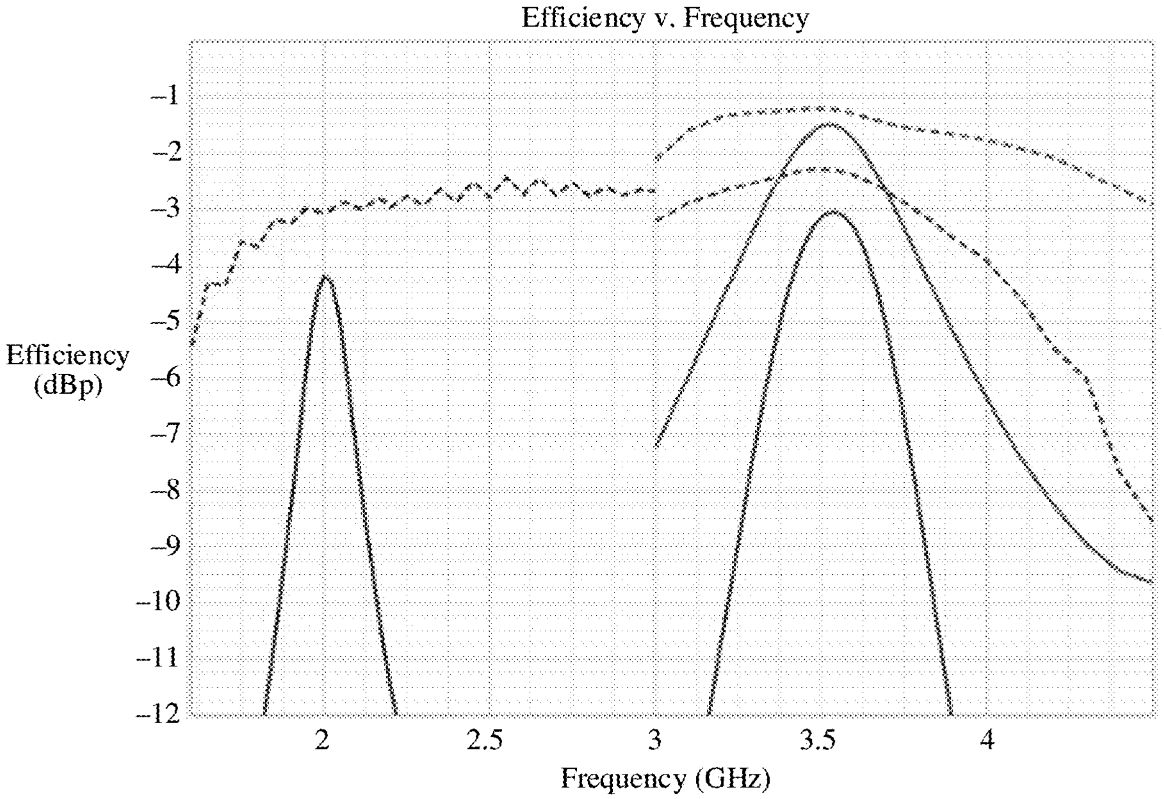
FIG. 13 is a diagram of radiation efficiency of the microstrip antenna shown in FIG. 9.

Refer to FIG. 13. Radiation efficiency of the first antenna is greater than 2 dBp when an operating frequency of the first antenna is 3.55 GHz. Radiation efficiency of the second antenna is greater than 1 dBp when an operating frequency of the second antenna is 3.55 GHz. Radiation efficiency of the third antenna is greater than 3 dBp when an operating frequency of the third antenna is 2.15 GHz. The first antenna, the second antenna, and the third antenna all have high radiation efficiency, so that the microstrip antenna 100 has high radiation efficiency, to improve the communication performance of the microstrip antenna 100.

On a surface of the radiator 50, that is, at a position 0 mm away from the microstrip antenna 100, a SAR value of the first antenna is 2.55 W/kg when the first antenna is on the 3.55 GHz operating frequency band of the first antenna, and a SAR value of the second antenna is 2.62 W/kg when the second antenna is on the 3.55 GHz operating frequency band of the second antenna. At a position 5.5 mm away from the radiator, the SAR value of the first antenna is 0.98 W/kg when the first antenna is on the 3.55 GHz operating frequency band of the first antenna, and the SAR value of the second antenna is 1.31 W/kg when the second antenna is on the 3.55 GHz operating frequency band of the second antenna. The SAR values of both the first antenna and the second antenna are low, and radiation of an electromagnetic wave generated by the microstrip antenna 100 to a human body is also small. When the third antenna is on the 2.15 GHz operating frequency band of the third antenna, a SAR value of the third antenna at a position 500 mm away from the radiator is 5.62 W/kg, and the SAR value at a position 5.5 mm away from the radiator is 4.53 W/kg. The third antenna is configured to receive a signal. Even if the SAR value of the third antenna is high, radiation damage is not caused to a human body. It should be noted that the SAR value is a value obtained by performing SAR simulation on the microstrip antenna 100 and normalizing SAR data based on a total radiated power TRP in free space being 19 dBm.

Figure 14:
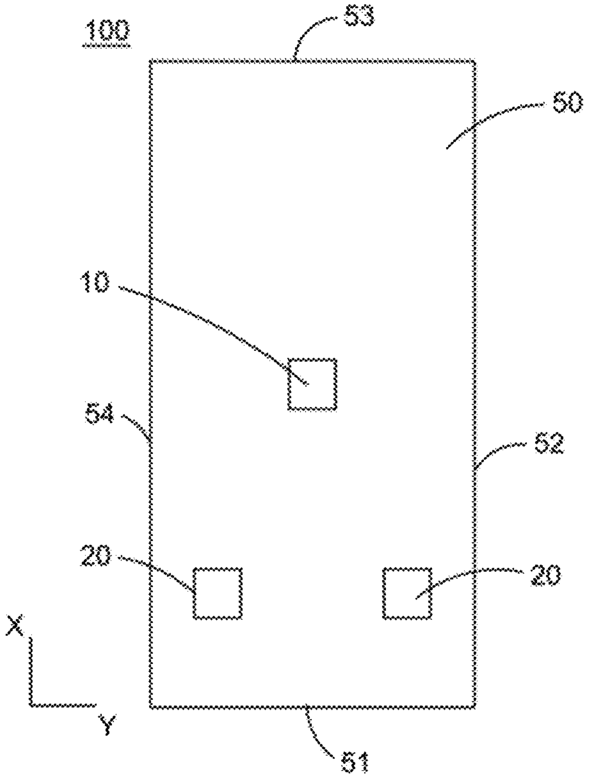
FIG. 14 is a schematic diagram of a structure of a microstrip antenna according to a second embodiment of this application.

Refer to FIG. 14. In another embodiment of this application, the first feedpoint 10 is located at the center of the radiator 50. A radio frequency signal is fed into the radiator 50 from the first feedpoint 10 in a center feeding manner, to excite the radiator 50 to generate the $TM_{02}$ mode. The second feedpoints 20 are offset relative to the central position of the radiator 50 in both the first direction X and the second direction Y, and the two second feedpoints 20 pass through the first feedpoint 10 along a symmetry axis in the first direction X. An adjustment circuit 23 is connected between the second feed B and the second feedpoints 20. The second feedpoints 20 are configured to feed a radio frequency signal into the radiator 50, and the second feedpoints 20 excite, by using the adjustment circuit 23 (as shown in FIG. 14), the radiator 50 to generate a $TM_{10}$ mode, so that the radiator 50 has performance of a dual-microstrip antenna. In this embodiment, the first feedpoint 10 is located at a center of the radiator 50 and has a symmetric structure. A magnetic field of the $TM_{02}$ mode is reversely canceled at the center of the radiator 50, so that two SAR hotspots are generated, a SAR value of a microstrip antenna 100 is reduced. The $TM_{10}$ mode and the $TM_{02}$ mode share the same large-aperture radiator 50, so that currents of the $TM_{10}$ mode on two sides of the first direction X are dispersed, a magnetic field generated by the $TM_{10}$ mode is dispersed, and a SAR value of the $TM_{10}$ mode is significantly reduced, to further reduce the radiation damage caused to a user by an electromagnetic wave generated by the microstrip antenna 100. In addition, the adjustment circuit 23 is configured to feed a radio frequency signal into the radiator 50 from the second feedpoints 20, to excite the radiator 50 to generate a pure $TM_{10}$ mode, so that high isolation exists between an antenna formed by the first feedpoint 10 and the radiator 50 and an antenna formed by the second feedpoints 20 and the radiator 50, to avoid signal interference that affects communication performance of the microstrip antenna 100.

In addition, positions of the second feedpoints 20 on the radiator 50 are asymmetric in the second direction Y, and the radiator 50 may be excited to generate $TM_{10}$. The positions of the second feedpoints 20 on the radiator 50 are asymmetric in the first direction X, and the radiator 50 may be excited to generate $TM_{01}$. In addition, the second feedpoints 20 deviate from the center of the radiator 50 in both the first direction X and the second direction Y, and the radiator 50 may be excited to generate a $TM_{11}$ high-order mode. In this embodiment, the $TM_{02}$ mode, the $TM_{10}$ mode, and the $TM_{01}$ mode may be excited simultaneously by arranging only the first feedpoint 10 and the second feedpoints 20, to save feedpoints and simplify a structure of the microstrip antenna 100. In addition, the radio frequency signal fed from the second feedpoints 20 may further excite the radiator 50 to generate a $TM_{11}$ high-order mode. The $TM_{10}$ mode and the $TM_{11}$ mode enable the antenna formed by the first feedpoint 10 and the radiator 50 to be a broadband antenna, to increase a radiation frequency band range of the microstrip antenna 100.

In an implementation, the $TM_{02}$ mode generated by the antenna formed by the first feedpoint 10 and the radiator 50 may cover the N77 frequency band. In the $TM_{10}$ mode and the $TM_{11}$ mode, the antenna formed by the second feedpoints 20 and the radiator 50 is a broadband antenna that can cover the complete N77 frequency band. In addition, the $TM_{01}$ mode generated by the antenna formed by the second feedpoints 20 and the radiator 50 may be used to cover an intermediate frequency LTE B3 frequency band. In another implementation, the $TM_{02}$, the $TM_{10}$ mode, the $TM_{01}$ mode, and the $TM_{11}$ mode may be used to cover another communication frequency band.

The $TM_{02}$ mode generates two SAR hotspots, which can effectively reduce the SAR value of the microstrip antenna 100. The $TM_{10}$ mode and the $TM_{02}$ mode share the same large-aperture radiator 50, so that a magnetic field generated by the $TM_{10}$ mode is dispersed, and a SAR value of the $TM_{10}$ mode is significantly reduced, to reduce the radiation damage caused to a user by an electromagnetic wave generated by the microstrip antenna 100. The $TM_{11}$ mode is a low SAR mode, and the SAR is low. A resonance of the $TM_{01}$ mode is close to 2.15 GHz, and the radiator 50 is not electrically large in size relative to a resonance point of the $TM_{01}$ mode, and has a high SAR value. In this embodiment, the $TM_{01}$ mode is configured to receive a signal, so that the $TM_{01}$ mode does not increase the SAR value of the microstrip antenna 100 while performing communication.

Figure 15:
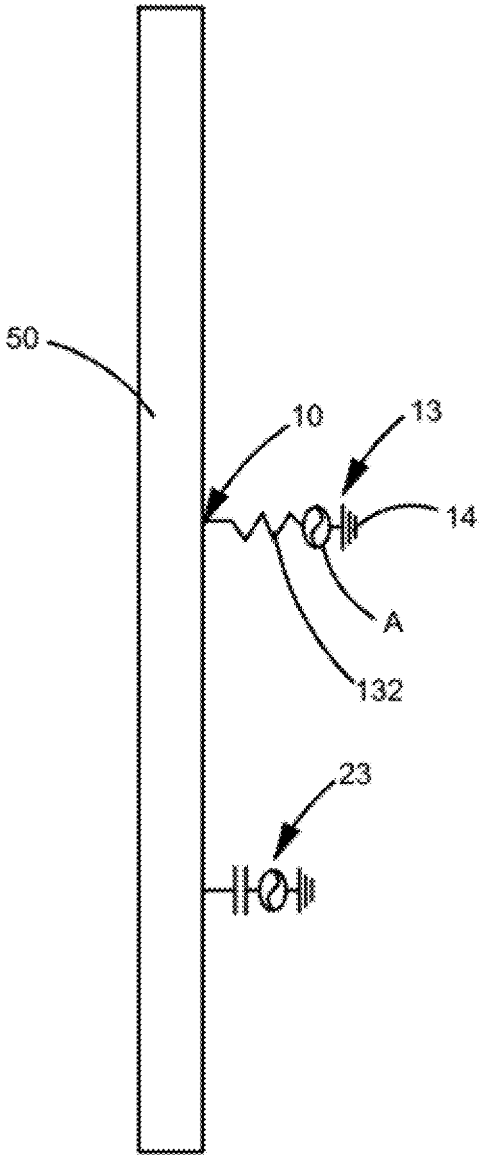
FIG. 15 is a schematic diagram of a structure of the microstrip antenna shown in FIG. 14 from another viewing angle.

Refer to FIG. 15. A first matching circuit 13 in this embodiment is the same as that in the previous embodiment. The first matching circuit 13 includes a first inductor 132, and the first inductor 132 is electrically connected to the first feedpoint 10. In another implementation, the first matching circuit 13 may include a first inductor 132 and a first capacitor that are connected in series. The first capacitor is electrically connected to the first feedpoint 10, and the first inductor 132 is electrically connected to the first feed A. The first matching circuit 13 feeds a radio frequency signal from the first feedpoint 10 into the radiator 50 in a central feeding manner, generates, on the radiator 50, currents that respectively flow from the first feedpoint 10 toward the second side 52 and the fourth side 54 in the first direction X, and excites the radiator 50 to generate the $TM_{02}$ mode. In addition, because the first feedpoint 10 is located at the central position of the radiator 50, the radiator 50 may be suppressed from generating a $TM_{01}$ mode and the $TM_{10}$ mode, so that the radiator 50 generates a pure $TM_{02}$ high-order mode. The first matching circuit 13 further includes a first ground point 14, the first ground point 14 is electrically connected to the first feed A, and the first ground point 14 is configured to be grounded.

Figure 16:
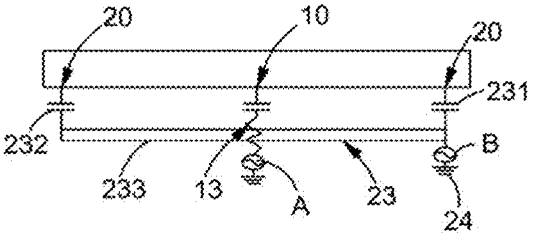
FIG. 16 is a schematic diagram of a structure of the microstrip antenna shown in FIG. 14 from another viewing angle.

Refer to FIG. 16. A structure of the adjustment circuit 23 in this embodiment is the same as that in the previous embodiment, and connection positions are different. The adjustment circuit 23 is formed by a second capacitor 231, a third capacitor 232, and a microstrip 233, and the second capacitor 231 and the third capacitor 232 are spaced apart in the second direction Y. The third capacitor 232 and the second capacitor 231 are electrically connected to the two second feedpoints 20 respectively, and the microstrip 233 is connected between the second capacitor 231 and the third capacitor 232 and generates a 180-degree phase difference. The adjustment circuit 23 further includes a second ground point 24, the second ground point 24 is electrically connected to the microstrip 233, and the second ground point 24 is configured to be grounded. In another embodiment, the adjustment circuit 23 may generate a 180-degree phase difference by using a balanced/unbalanced converter or a phase shifter. A radio frequency signal is fed into the radiator 50 from the second feedpoints 20 by using the adjustment circuit 23, so that high isolation exists between an antenna formed by the first feedpoint 10 and the radiator 50 and an antenna formed by the second feedpoints 20 and the radiator 50, to avoid signal interference that affects communication performance of the microstrip antenna 100.

Figure 17:
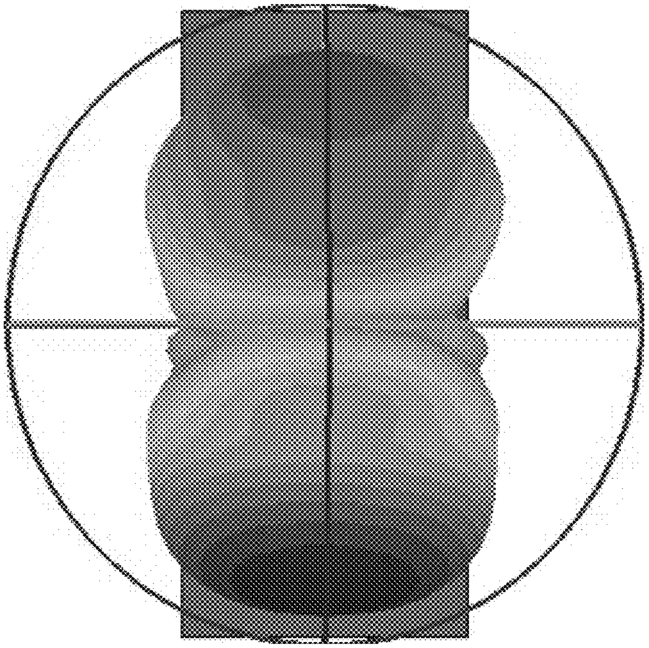
FIG. 17 is a magnetic field direction diagram of a TM02 mode of the microstrip antenna shown in FIG. 14.
Figure 18:
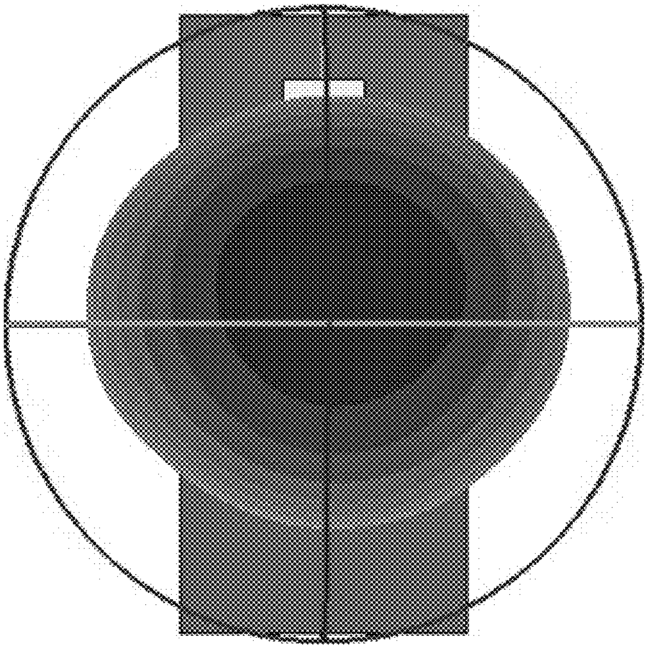
FIG. 18 is a magnetic field direction diagram of a TM10 mode of the microstrip antenna shown in FIG. 14.

Refer to FIG. 17 and FIG. 18. A radiation pattern of the $TM_{02}$ mode is Monopolar, and a radiation pattern of the $TM_{10}$ mode is Broadside. Radiation directions of the $TM_{02}$ mode and the $TM_{10}$ mode have good complementary characteristics, so that the microstrip antenna 100 has better radiation performance in a plurality of directions, and communication performance of the microstrip antenna 100 is improved.

Figure 19:
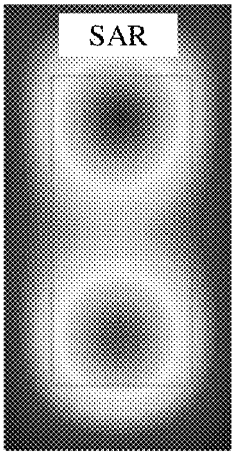
FIG. 19 is a hotspot distribution diagram of a TM02 mode of the microstrip antenna shown in FIG. 14.
Figure 20:
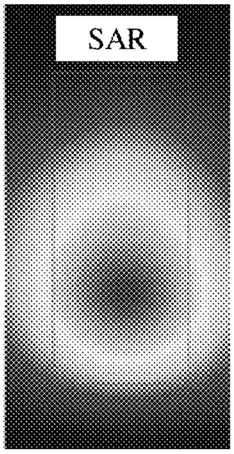
FIG. 20 is a hotspot distribution diagram of a TM10 mode of the microstrip antenna shown in FIG. 14.
Figure 21:
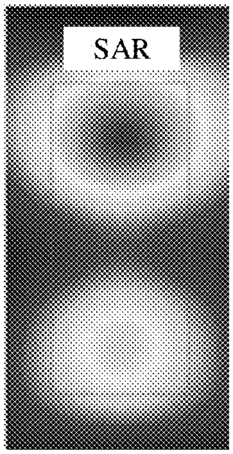
FIG. 21 is a hotspot distribution diagram of a TM11 mode of the microstrip antenna shown in FIG. 14.

Refer to FIG. 19. The $TM_{02}$ mode generates a dual-SAR hotspot on the radiator, which can effectively reduce the SAR value of the microstrip antenna 100. Refer to FIG. 20. A hotspot of the $TM_{10}$ mode diffuses from the center of the radiator to a surrounding area, so that the SAR value of the $TM_{10}$ mode is significantly reduced. Refer to FIG. 21. Hotspots of the $TM_{11}$ mode are sparsely distributed on the radiator, and the $TM_{11}$ mode also has a low SAR value.

Figure 22:
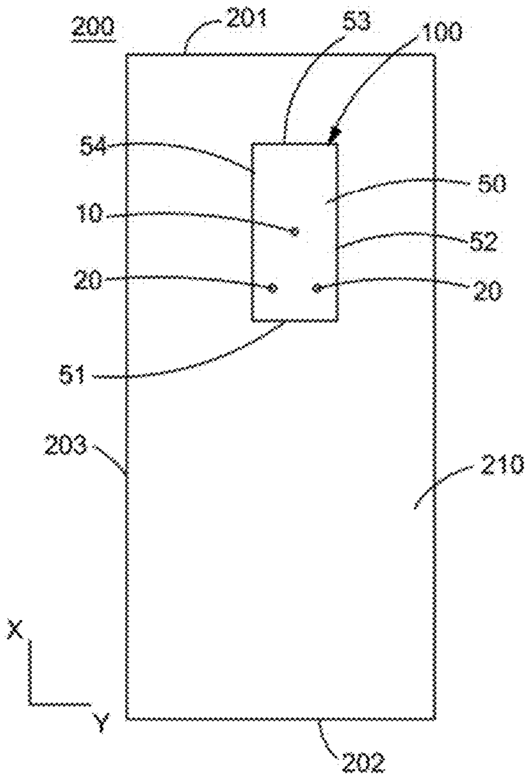
FIG. 22 is a partial schematic diagram of a structure of an electronic device having the microstrip antenna shown in FIG. 14.

Refer to FIG. 22. In a specific embodiment, a size of a long side of the circuit board 210 is 155 mm, and a size of a short side of the circuit board is 72 mm. The length of the radiator 50 is 46 mm, and the width of the radiator is 20 mm. The width of the radiator 50 is close to a half of the length, and is within a tolerance range. The radiator 50 is mounted on the circuit board 210, and the second side 52 and the fourth side 54 of the radiator 50 are parallel to the top side 201 and the bottom side 202 of the circuit board 210. The first side 51 and the third side 53 of the radiator 50 are parallel to the two lateral sides 203 of the circuit board 210. A height between the radiator 50 and the circuit board 210 is 2 mm, and a distance between the fourth side 54 and the top side 201 is 16 mm. The first feedpoint 10 is located at the center of the radiator 50, that is, the first feedpoint 10 is located at both the center in the first direction X and the center in the second direction Y. The two second feedpoints 20 deviate from the center of the radiator 50 by 14 mm toward the second side 52 and the fourth side 54 respectively in the first direction X, and deviate from the center of the radiator 50 by 9 mm toward the third side 53 in the second direction Y. As shown in FIG. 14 and FIG. 15, an inductance of the first inductor 132 is 0.6 nH. A capacity of the second capacitor 231 and a capacity of the third capacitor 232 are both 0.6 pF, and the impedance of the microstrip 233 is 50 ohms. The first feedpoint 10, the first feed A, the first matching circuit 13, and the radiator 50 form a first antenna, the second feedpoints 20, the second feed B, the adjustment circuit 23, and the radiator 50 form a second antenna.

Figure 23:
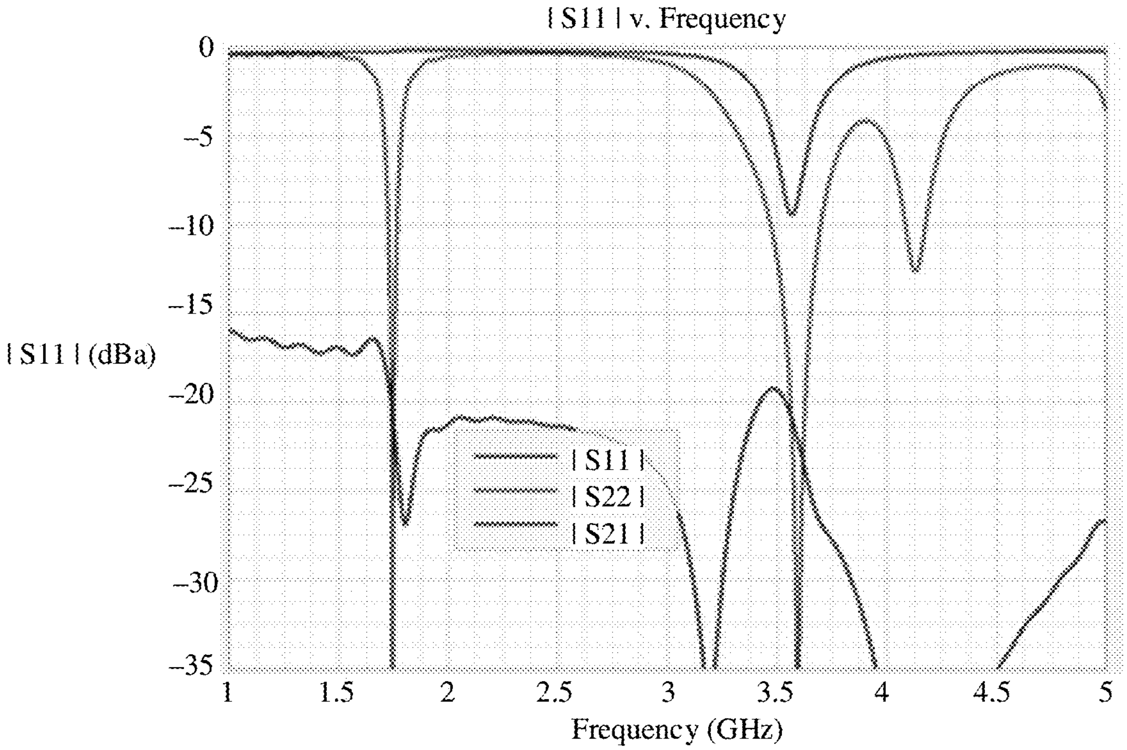
FIG. 23 is an S parameter diagram of the microstrip antenna shown in FIG. 14.

Refer to FIG. 23. S11 is the S parameter curve of the first antenna, that is, the antenna formed by the first feedpoint 10 and the radiator 50, and S22 is the S parameter curve of the second antenna, that is, the antenna formed by the second feedpoints 20 and the radiator 50. The resonance frequencies of the first antenna are all 3.55 GHz, and the resonance frequencies of the second antenna are 3.55 GHz, 4.15 GHz, and 1.75 GHz. S21 is an S parameter curve of the dual antenna formed by the first antenna and the second antenna. When a frequency is close to 3.55 GHz, close to 4.15 GHz, and close to 1.75 GHz, that is, operating frequency bands of the first antenna and the second antenna, a gain of the dual antenna formed by the first antenna and the second antenna is greater than 20 dB, and isolation between the first antenna and the second antenna is high, so that interference between the first antenna and the second antenna can be avoided, and the communication performance of the microstrip antenna 100 is affected.

Figure 24:
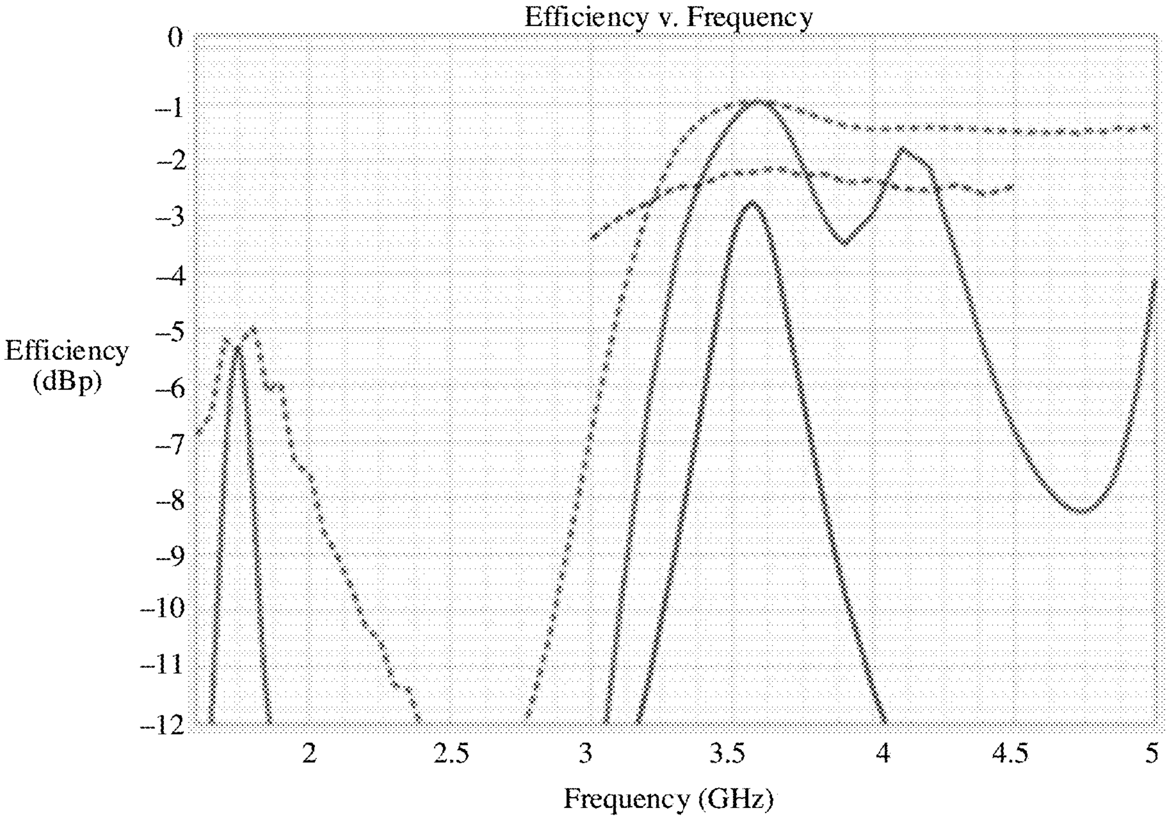
FIG. 24 is a diagram of radiation efficiency of the microstrip antenna shown in FIG. 14.

Refer to FIG. 24. Radiation efficiency of the first antenna is greater than 2 dBp when an operating frequency of the first antenna close to 3.55 GHz. Radiation efficiency of the second antenna is greater than 5 dBp when an operating frequency of the second antenna is close to 1.75 GHz. Radiation efficiency of the second antenna is greater than 1 dBp when an operating frequency of the second antenna is close to 3.55 GHz. Radiation efficiency of the second antenna is greater than 1 dBp when an operating frequency of the second antenna is close to 4.15 GHz. The first antenna and the second antenna both have high radiation efficiency, so that the microstrip antenna 100 has high radiation efficiency, to improve the communication performance of the microstrip antenna 100.

On a surface of the radiator 50, that is, at a position 0 mm away from the microstrip antenna 100, a SAR value of the first antenna is 3.08 W/kg when the first antenna is on the 3.55 GHz operating frequency band of the first antenna, a SAR value of the second antenna is 2.94 W/kg when the second antenna is on the 3.55 GHz operating frequency band, and a SAR value of the second antenna is 2.73 W/kg when the second antenna is on the 4.15 GHz operating frequency band of the second antenna. At a position 5.5 mm away from the radiator, the SAR value of the first antenna is 1.36 W/kg when the first antenna is on the 3.55 GHz operating frequency band of the first antenna, the SAR value of the second antenna is 1.34 W/kg when the second antenna is on the 3.55 GHz operating frequency band of the second antenna, and the SAR value of the second antenna is 1.17 W/kg when the second antenna is on the 4.15 GHz operating frequency band of the second antenna. When the operating frequency band of the first antenna is 3.55 GHz and when the operating frequency band of the second antenna is 3.15 GHz and 4.15 GHz, SAR values are low, and radiation of an electromagnetic wave generated by the microstrip antenna 100 to a human body is also small. When the second antenna is on the 1.75 GHz operating frequency band of the second antenna, a SAR value of the third antenna at a position 500 mm away from the radiator is 5.62 W/kg, and the SAR value at a position 5.5 mm away from the radiator is 4.53 W/kg. The third antenna is configured to receive a signal. Even if the SAR value of the third antenna is high, radiation damage is not caused to a human body. It should be noted that the SAR value is a value obtained by performing SAR simulation on the microstrip antenna 100 and normalizing SAR data based on a total radiated power TRP in free space being 19 dBm.

Figure 25:
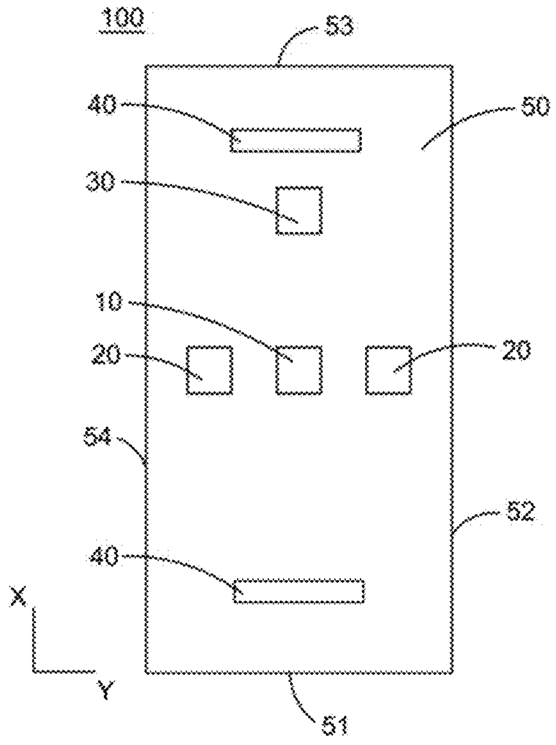
FIG. 25 is a schematic diagram of a structure of a microstrip antenna according to a third embodiment of this application.

Refer to FIG. 25. In a third embodiment of this application, a through groove 40 is provided in the radiator 50, a length of the through groove 40 extends in the second direction Y, and the through groove 40 is provided in the first direction X spaced apart from the first feedpoint 10. An electrical length of the radiator 50 in the first direction X is equal to the wavelength of the operating frequency band of the microstrip antenna 100, and an electrical length of the radiator 50 in the second direction Y is a half of the wavelength of the operating frequency band of the microstrip antenna 100. In addition, the through groove 40 is symmetrically disposed relative to the radiator 50 along a central axis in the first direction X. In another implementation, the through groove 40 may be of another size. In this embodiment, the through groove 40 extending in the second direction Y is provided in the radiator 50, so that the size of the radiator 50 in the first direction X can be reduced, to facilitate miniaturization of the microstrip antenna 100. Specifically, there are two through grooves 40. The two through grooves 40 are of a same shape and size, and the two through grooves 40 are symmetrically disposed relative to the radiator 50 along a central axis in the second direction Y. In other words, the two through grooves 40 and the radiator 50 are perpendicular to each other along the central axis in the second direction Y. The two symmetric through grooves 40 are disposed, so that the size of the radiator 50 in the first direction X can be further shortened.

Continue to refer to FIG. 25. The first feedpoint 10 is located at the center of the radiator 50. A radio frequency signal is fed into the radiator 50 from the first feedpoint 10 in a center feeding manner, to excite the radiator 50 to generate the $TM_{02}$ mode. The second feedpoints 20 and the first feedpoint 10 are arranged side by side in the second direction Y, and the two second feedpoints 20 are symmetrically distributed on two opposite sides of the first feedpoint 10 with respect to the first feedpoint 10. One second feedpoint 20 is located between the first feedpoint 10 and the second side 52, and the other second feedpoint 20 is located between the first feedpoint 10 and the fourth side 54. In addition, both the two second feedpoints 20 are located at a central position of the radiator 50 in the first direction X. An adjustment circuit 25 (as shown in FIG. 23) is connected between the second feedpoints 20 and the radiator 50. The second feedpoints 20 are configured to feed a radio frequency signal into the radiator 50, and the second feedpoints 20 excite, by using the adjustment circuit 21, the radiator 50 to generate a $TM_{10}$ mode. In this embodiment, the first feedpoint 10 is located at a center of the radiator 50 and has a symmetric structure. A magnetic field of the $TM_{02}$ mode is reversely canceled at the center of the radiator 50, so that two SAR hotspots are generated, a SAR value of a microstrip antenna 100 is reduced. The $TM_{10}$ mode and the $TM_{02}$ mode share the same large-aperture radiator 50, so that currents of the $TM_{10}$ mode on two sides of the first direction X are dispersed, a magnetic field generated by the $TM_{10}$ mode is dispersed, and a SAR value of the $TM_{10}$ mode is significantly reduced, to further reduce the radiation damage caused to a user by an electromagnetic wave generated by the microstrip antenna 100. In addition, the adjustment circuit 21 is configured to feed a radio frequency signal into the radiator from the second feedpoints 20, to excite the radiator 50 to generate a pure $TM_{10}$ mode, so that high isolation exists between an antenna formed by the first feedpoint 10 and the radiator 50 and an antenna formed by the second feedpoints 20 and the radiator 50, to avoid signal interference that affects communication performance of the microstrip antenna 100.

Figure 26:
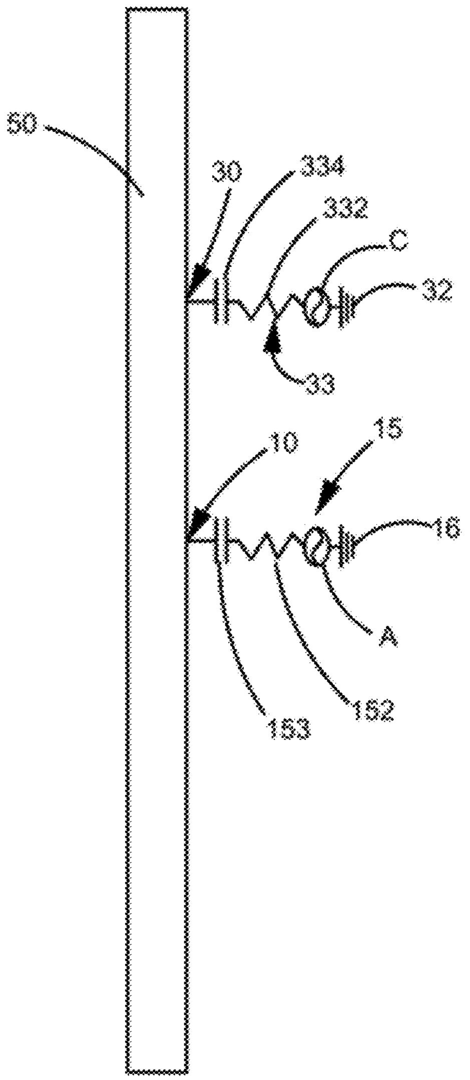
FIG. 26 is a schematic diagram of a structure of the microstrip antenna shown in FIG. 25 from another viewing angle.

Refer to FIG. 26. A first matching circuit 15 in this embodiment is the same as that in the previous embodiment. Specifically, the first matching circuit 15 includes a first inductor 152 and a first capacitor 153 that are connected in series. Two ends of the first inductor 152 are electrically connected to the first capacitor 153 and the first feed A respectively, an end of the first capacitor 153 away from the first inductor 152 is electrically connected to the first feedpoint 10, and the first feed A is further electrically connected to the radio frequency module. A radio frequency signal generated by the radio frequency module is first transmitted to the first feed A, then transmitted from the first feed A to the first inductor 152, then transmitted from the first inductor 152 to the first capacitor 153, and then fed into the radiator 50 from the first capacitor 153 through the first feedpoint 10. The first matching circuit 15 further includes a first ground point 16, the first ground point 16 is electrically connected to the first feed A, and the first ground point 16 is configured to be grounded. The first matching circuit 15 feeds a radio frequency signal from the first feedpoint 10 into the radiator 50 in a central feeding manner, generates, on the radiator 50, currents that respectively flow from the first feedpoint 10 toward the second side 52 and the fourth side 54 in the first direction X, and excites the radiator 50 to generate the $TM_{02}$ mode. In addition, because the first feedpoint 10 is located at the central position of the radiator 50, the radiator 50 may be suppressed from generating a $TM_{01}$ mode and the $TM_{10}$ mode, so that the radiator 50 generates a pure $TM_{02}$ high-order mode.

Figure 27:
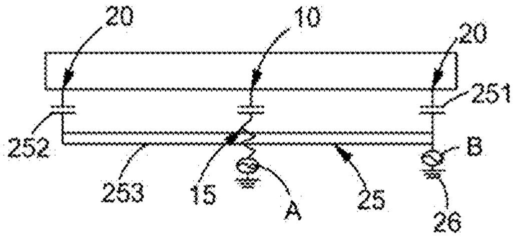
FIG. 27 is a schematic diagram of a structure of the microstrip antenna shown in FIG. 25 from another viewing angle.

Refer to FIG. 27. A structure of the adjustment circuit 25 in this embodiment is the same as that in the first embodiment. The adjustment circuit 25 may be formed by a second capacitor 251, a third capacitor 252, and a microstrip 253, and the second capacitor 251 and the third capacitor 252 are spaced apart in the second direction Y. The second capacitor 251 is electrically connected to the second feedpoint 20 located between the first feedpoint 10 and the second side 52, the third capacitor 252 is electrically connected to the second feedpoint 20 located between the first feedpoint 10 and the fourth side 54, and the microstrip 253 is connected between the second capacitor 251 and the third capacitor 252 and generates a 180-degree phase difference. The adjustment circuit 25 further includes a second ground point 26, the second ground point 26 is electrically connected to the microstrip 253, and the second ground point 26 is configured to be grounded. In another embodiment, the adjustment circuit 25 may generate a 180-degree phase difference by using a balanced/unbalanced converter or a phase shifter. A radio frequency signal is fed into the radiator 50 from the second feedpoints 20 by using the adjustment circuit 25, so that high isolation exists between an antenna formed by the first feedpoint 10 and the radiator 50 and an antenna formed by the second feedpoints 20 and the radiator 50, to avoid signal interference that affects communication performance of the microstrip antenna 100.

Figure 28:
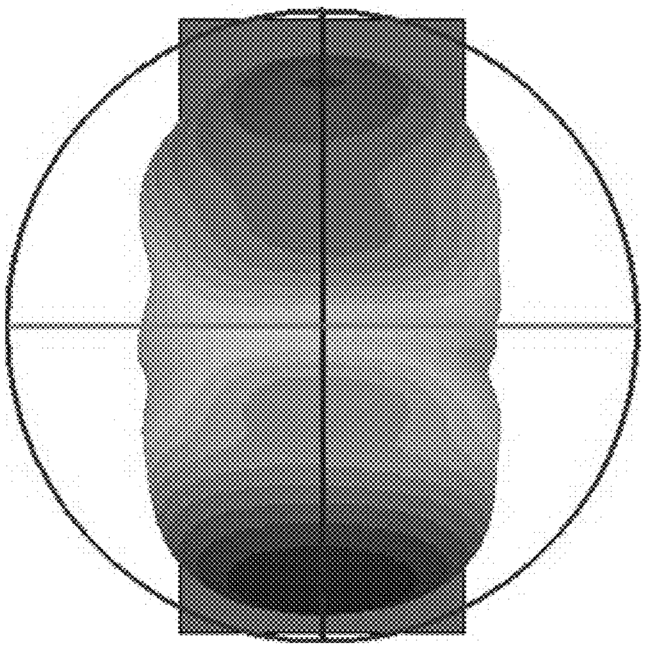
FIG. 28 is a magnetic field direction diagram of a TM02 mode of the microstrip antenna shown in FIG. 25.
Figure 29:
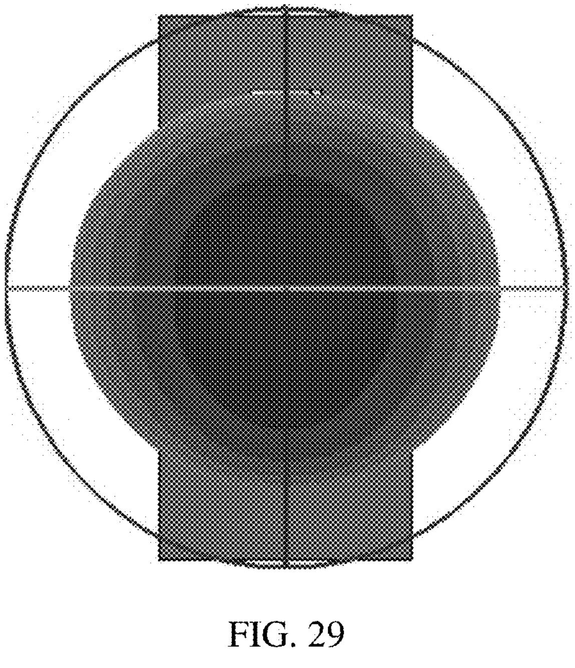
FIG. 29 is a magnetic field direction diagram of a TM10 mode of the microstrip antenna shown in FIG. 25.

Refer to FIG. 28 and FIG. 29. A radiation pattern of the $TM_{02}$ mode is Monopolar, and a radiation pattern of the $TM_{10}$ mode is Broadside. Radiation directions of the $TM_{02}$ mode and the $TM_{10}$ mode have good complementary characteristics, so that the microstrip antenna 100 has better radiation performance in a plurality of directions, and communication performance of the microstrip antenna 100 is improved.

Figure 30:
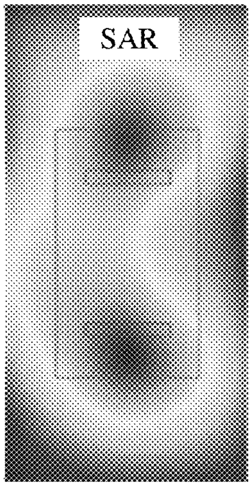
FIG. 30 is a hotspot distribution diagram of a TM02 mode of the microstrip antenna shown in FIG. 25.
Figure 31:
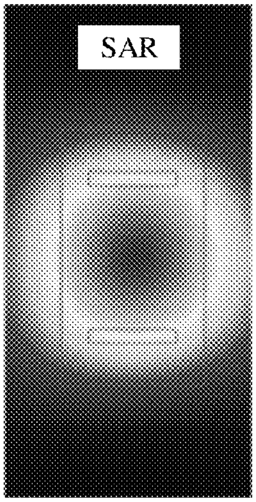
FIG. 31 is a hotspot direction diagram of a TM10 mode of the microstrip antenna shown in FIG. 25.

Refer to FIG. 30. The $TM_{02}$ mode generates a dual-SAR hotspot on the radiator, which can effectively reduce the SAR value of the microstrip antenna 100. Refer to FIG. 31. A hotspot of the $TM_{10}$ mode diffuses from the center of the radiator to a surrounding area, so that the SAR value of the $TM_{10}$ mode is significantly reduced.

Refer to FIG. 25. The microstrip antenna 100 further includes a third feedpoint 30 and a third feed C. The third feedpoint 30 is disposed on the radiator 50, deviates from the central position of the radiator 50 in the first direction X, and is spaced apart from the first feedpoint 10. The third feedpoint 30 is electrically connected to the third feed C, and is configured to feed a radio frequency signal into the radiator 50, to excite the radiator 50 to generate the $TM_{01}$ mode, to further improve utilization of the radiator 50. In this embodiment, a resonance of the $TM_{01}$ mode generated by an antenna formed by the third feedpoint 30 and the radiator 50 is close to 2.15 GHz, and the radiator 50 is not electrically large in size relative to a resonance point of the $TM_{01}$ mode, and has a high SAR value. In this embodiment, the antenna formed by the third feedpoint 30 and the radiator 50 is used as a receive antenna, so that the antenna formed by the third feedpoint 30 and the radiator 50 does not increase the SAR value of the microstrip antenna 100 while performing communication.

Refer to FIG. 26. A third matching circuit 33 includes a fourth capacitor 334 and a third inductor 332 that are connected in series. Two ends of the third inductor 332 are electrically connected to the fourth capacitor 334 and the third feed C respectively. An end the fourth capacitor 334 away from the third inductor 332 is electrically connected to the third feedpoint 30, and the third feed C is further electrically connected to the radio frequency module. A radio frequency signal generated by the radio frequency module is first transmitted to the third feed C, then transmitted from the third feed C to the third inductor 332, then transmitted from the third inductor 332 to the fourth capacitor 334, and then fed into the radiator 50 from the fourth capacitor 334 through the third feedpoint 30. The third matching circuit 33 is configured to feed a radio frequency signal from the third feedpoint 30 into the radiator 50, to excite the radiator 50 to generate the $TM_{01}$ mode. The third matching circuit 33 further includes a third ground point 34, the third ground point 34 is electrically connected to the third feed C, and the third ground point 34 is configured to be grounded.

Figure 32:
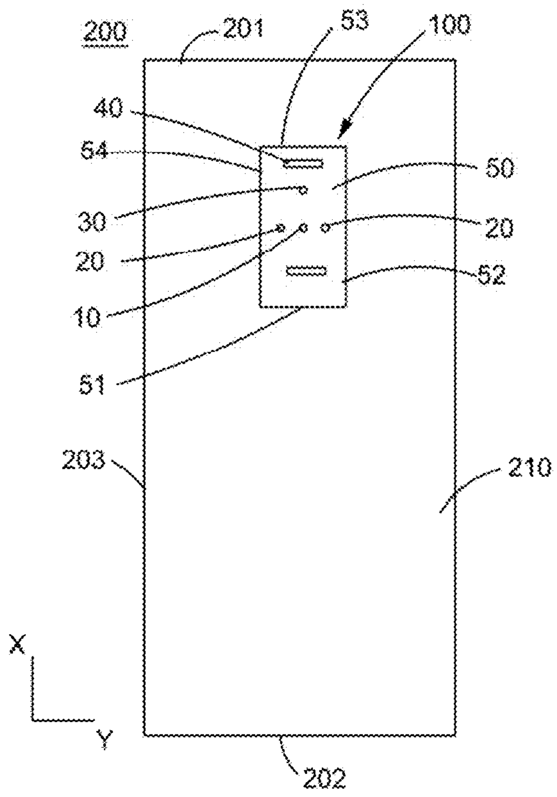
FIG. 32 is a partial schematic diagram of a structure of an electronic device having the microstrip antenna shown in FIG. 25.

Refer to FIG. 32. In a specific embodiment, a size of a long side of the circuit board 210 is 155 mm, and a size of a short side of the circuit board is 72 mm. The length of the radiator 50 is 36 mm, and the width of the radiator is 20 mm. The through groove 40 is rectangular, a size of the through groove 40 in the first direction X is 2 mm, and a size of the through groove 40 in the second direction Y is 12 mm. The radiator 50 is mounted on the circuit board 210, and the second side 52 and the fourth side 54 of the radiator 50 are parallel to the top side 201 and the bottom side 202 of the circuit board 210. The first side 51 and the third side 53 of the radiator 50 are parallel to the two lateral sides 203 of the circuit board 210. A height between the radiator 50 and the circuit board 210 is 2 mm, and a distance between the fourth side 54 and the top side 201 is 23 mm. The first feedpoint 10 is located at the center of the radiator 50, that is, the first feedpoint 10 is located at both the center in the first direction X and the center in the second direction Y. The second feedpoints 20 and the first feedpoint 10 are arranged side by side in the second direction Y. The two second feedpoints 10 are symmetrically distributed on two opposite sides of the first feedpoint 10 with respect to the first feedpoint 10. Distances between the two second feedpoints 20 and the first feedpoint 10 are both 9 mm. The third feedpoint 30 deviates from the center of the radiator 50 by 10 mm in the first direction X toward the fourth side 54, and the third feedpoint 30 is located at a central position of the radiator 50 in the second direction Y. As shown in FIG. 22 and FIG. 23, a capacity of the first capacitor 153 is 0.2 pF, and an inductance of the first inductor 152 is 8.2 nH. A capacity of the second capacitor 251 and a capacity of the third capacitor 252 are both 0.6 pF, and the impedance of the microstrip 253 is 50 ohms. An inductance of the third inductor 332 is 6.8 nH, and a capacity of the fourth capacitor 334 is 0.8 pF. The first feedpoint 10, the first feed A, the first matching circuit 15, and the radiator 50 form a first antenna, the second feedpoints 20, the second feed B, the adjustment circuit 25, and the radiator 50 form a second antenna, and the third feedpoint 30, the third feed C, the third matching circuit 33, and the radiator 50 form a third antenna.

Figure 33:
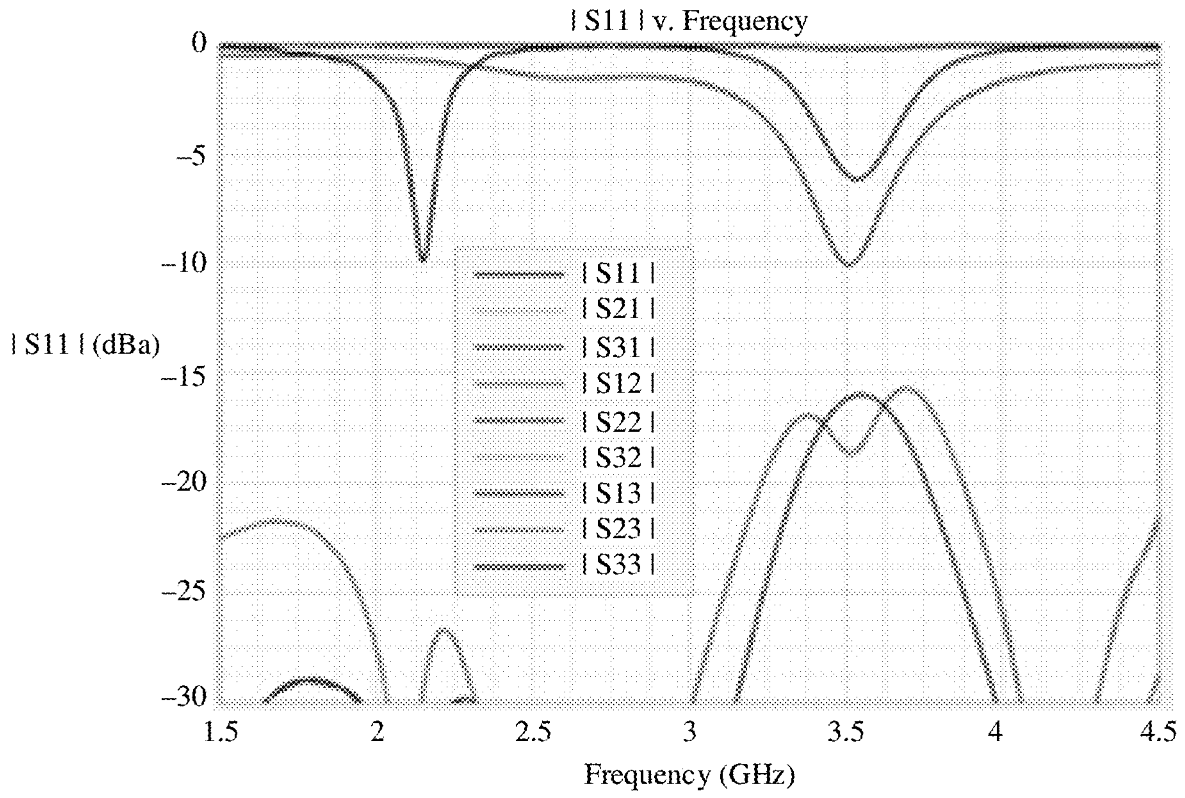
FIG. 33 is an S parameter diagram of the microstrip antenna shown in FIG. 25.

Refer to FIG. 33. S11 is an S parameter curve of the first antenna, S22 is an S parameter curve of the second antenna, and S33 is an S parameter curve of the third antenna. Resonance frequencies of the first antenna and the second antenna are both 3.55 GHz, and a resonance frequency of the third antenna is 2.15 GHz. S21 and S12 are S parameter curves of a dual antenna formed by the first antenna and the second antenna. When a frequency is close to 3.55 GHz, that is, operating frequency bands of the first antenna and the second antenna, a gain of the dual antenna formed by the first antenna and the second antenna is greater than 18 dB, and isolation between the first antenna and the second antenna is high. S31 and S13 are S parameter curves of a dual antenna formed by the first antenna and the third antenna. When a frequency is 3.55 GHz, a gain of the dual antenna formed by the first antenna and the third antenna is greater than 16 dB, and isolation between the first antenna and the third antenna is high when an operating frequency is 3.55 GHz. In addition, when the frequency is 2.15 GHz, the gain of the dual antenna formed by the first antenna and the third antenna is also large, and isolation between the first antenna and the third antenna is high when the operating frequency is 2.15 GHz. S23 and S32 are S parameter curves of a dual antenna formed by the second antenna and the third antenna. When the frequencies are 3.55 GHz and 2.15 GHz, a gain of the dual antenna formed by the second antenna and the third antenna is large, and isolation between the second antenna and the third antenna is high when the operating frequency is 2.15 GHz and 3.55 GHz. High isolation between every two of the first antenna, the second antenna, and the third antenna ensures that the first antenna, the second antenna, and the third antenna do not interfere with each other when operating simultaneously, so that communication performance of the microstrip antenna 100 is improved.

Figure 34:
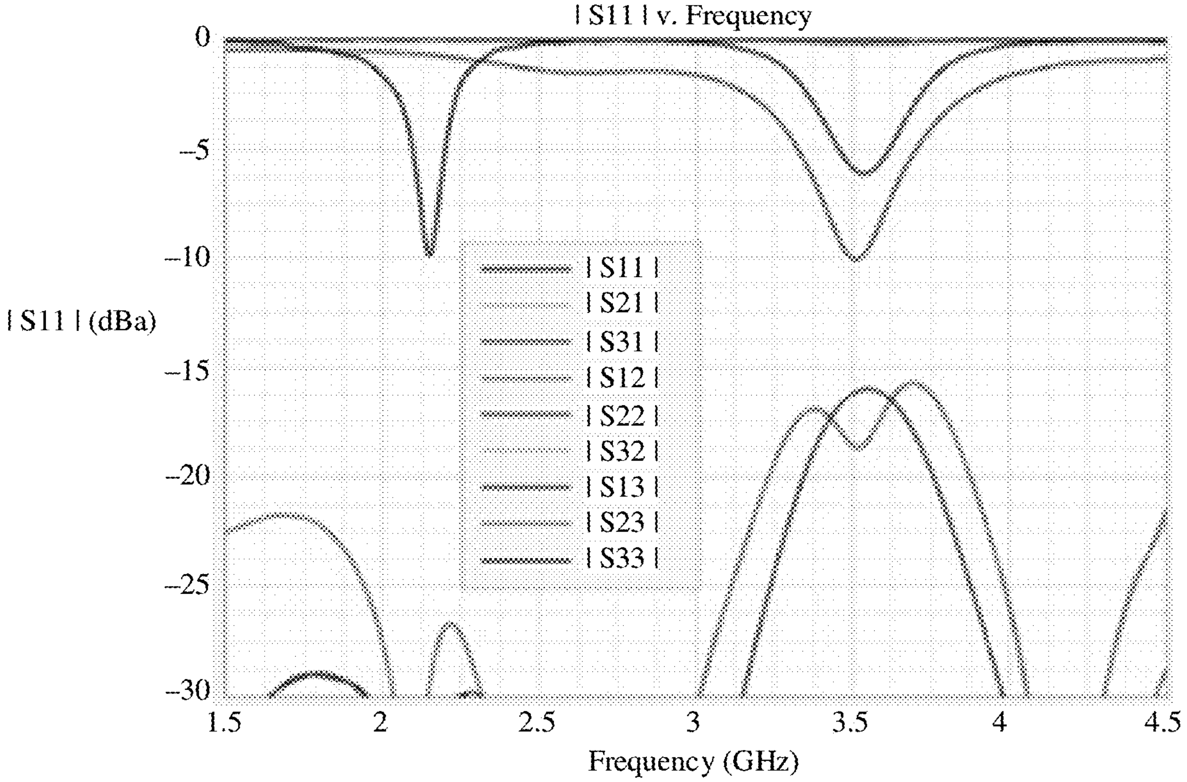
FIG. 34 is a diagram of radiation efficiency of the microstrip antenna shown in FIG. 25.

Refer to FIG. 34. Radiation efficiency of the first antenna is greater than 3 dBp when an operating frequency of the first antenna is 3.55 GHz. Radiation efficiency of the second antenna is greater than 1 dBp when an operating frequency of the second antenna is 3.55 GHz. Radiation efficiency of the third antenna is greater than 3 dBp when an operating frequency of the third antenna is 2.15 GHz. The first antenna, the second antenna, and the third antenna all have high radiation efficiency, so that the microstrip antenna 100 has high radiation efficiency, to improve the communication performance of the microstrip antenna 100.

On a surface of the radiator 50, that is, at a position 0 mm away from the microstrip antenna 100, a SAR value of the first antenna is 3.13 W/kg when the first antenna is on the 3.55 GHz operating frequency band of the first antenna, and a SAR value of the second antenna is 3.15 W/kg when the second antenna is on the 3.55 GHz operating frequency band of the second antenna. At a position 5.5 mm away from the radiator, the SAR value of the first antenna is 0.91 W/kg when the first antenna is on the 3.55 GHz operating frequency band of the first antenna, and the SAR value of the second antenna is 1.57 W/kg when the second antenna is on the 3.55 GHz operating frequency band of the second antenna. The SAR values of both the first antenna and the second antenna are low, and radiation of an electromagnetic wave generated by the microstrip antenna 100 to a human body is also small. When the third antenna is on the 2.15 GHz operating frequency band of the third antenna, a SAR value of the third antenna at a position 500 mm away from the radiator is 6.36 W/kg, and the SAR value at a position 5.5 mm away from the radiator is 4.98 W/kg. The third antenna is configured to receive a signal. Even if the SAR value of the third antenna is high, radiation damage is not caused to a human body. It should be noted that the SAR value is a value obtained by performing SAR simulation on the microstrip antenna 100 and normalizing SAR data based on a total radiated power TRP in free space being 19 dBm.

In another embodiment of this application, a difference from the previous embodiment lies in that no through groove 40 is provided in the radiator 50, and the length and the width of the radiator 50 are adjusted by adding a branch (not shown in the figure) to a part of the radiator 50 or by using capacitive or inductive loading, to reduce the size of the radiator 50. The size of the radiator 50, a structure and a size of the branch, and the capacitive or inductive loading are not specifically limited herein, provided that the electrical length of the radiator 50 in the first direction X is equal to the wavelength of the operating frequency band of the microstrip antenna 100, and the electrical length of the radiator 50 in the second direction Y is a half of the wavelength of the operating frequency band of the microstrip antenna 100.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A microstrip antenna, disposed in an electronic device, the microstrip antenna comprising:

a radiator; and a first feed and a second feed, wherein a first feedpoint and two second feedpoints are disposed on the radiator, the first feedpoint is located at a central position of the radiator and is electrically connected to the first feed, the first feedpoint is configured to feed a first radio frequency signal into the radiator to excite the radiator to generate a $TM_{02}$ mode, and wherein the two second feedpoints are spaced apart from the first feedpoint, the second feed is electrically connected to the second feedpoints through an adjustment circuit, the second feedpoints are configured to feed a second radio frequency signal into the radiator, and the second feedpoints are configured to excite the radiator to generate a $TM_{10}$ mode through the adjustment circuit to perform as a dual-microstrip antenna.

2. The microstrip antenna according to claim 1, wherein the first feedpoint is configured to feed the first radio frequency signal into the radiator in a centrosymmetric feeding manner and generate a current in a first direction on the radiator, and the two second feedpoints are configured to feed the second radio frequency signal into the radiator in a distributed feeding manner and generate a current in a second direction on the radiator, wherein the first direction is perpendicular to the second direction.

3. The microstrip antenna according to claim 2, wherein the radiator is rectangular, a size of the radiator in the first direction is three quarters to five quarters of a wavelength of an operating frequency band of the microstrip antenna, and a size of the radiator in the second direction is three eighths to five eighths of the wavelength of the operating frequency band of the microstrip antenna, wherein the first direction is a length direction of the radiator, and the second direction is a width direction of the radiator.

4. The microstrip antenna according to claim 3, wherein the size of the radiator in the second direction is a half of the size of the radiator in the first direction.

5. The microstrip antenna according to claim 2, wherein the adjustment circuit comprises: a second capacitor, a third capacitor, and a microstrip that are electrically connected to the radiator, the second capacitor and the third capacitor are spaced apart in the second direction, the second capacitor and the third capacitor are electrically connected to the second feedpoints, a straight-line length of the microstrip is a half of a wavelength of an operating frequency band of an antenna provided by the second feedpoints and the radiator, and the microstrip is connected between the second capacitor and the third capacitor and generates a 180-degree phase difference.

6. The microstrip antenna according to claim 5, wherein capacities of both the second capacitor and the third capacitor are 0.6 pF, and impedance of the microstrip is 50 ohms.

7. The microstrip antenna according to claim 2, wherein the adjustment circuit comprises a balanced/unbalanced converter, and the balanced/unbalanced converter is connected to the radiator and the second feedpoints to have a 180-degree phase difference.

8. The microstrip antenna according to claim 2, wherein the adjustment circuit comprises a phase shifter, and the phase shifter is connected to the radiator and the second feedpoints to have a 180-degree phase difference.

9. The microstrip antenna according to claim 2, wherein:

the two second feedpoints and the first feedpoint are disposed side by side in the second direction, and the two second feedpoints are distributed on two opposite sides of the first feedpoint symmetrically with respect to the first feedpoint; or the two second feedpoints are offset relative to the central position of the radiator in both the first direction and the second direction, and the two second feedpoints pass through the first feedpoint along a symmetry axis in the first direction.

10. The microstrip antenna according to claim 9, wherein the two second feedpoints are offset relative to the central position of the radiator in both the first direction and the second direction and are spaced apart from the first feedpoint, and the second feedpoints are further configured to feed a third radio frequency signal into the radiator to excite the radiator to generate a $TM_{01}$ mode and a $TM_{11}$ mode.

11. The microstrip antenna according to claim 2, wherein a first matching circuit is connected between the first feedpoint and the first feed, the first matching circuit comprises a first capacitor and a first inductor that are connected in series, and wherein:

the first capacitor is electrically connected to the first feedpoint, and the first inductor is electrically connected to the first feed; or the first matching circuit comprises a first inductor, and the first inductor is electrically connected to the first feed and the first feedpoint.

12. The microstrip antenna according to claim 2, wherein the microstrip antenna further comprises a third feedpoint, a third feed, and a third matching circuit, the third feedpoint is disposed on the radiator, deviates from the central position of the radiator in the first direction, and is spaced apart from the first feedpoint, the third matching circuit is electrically connected to the third feedpoint and the third feed, and the third feedpoint is configured to feed a fourth radio frequency signal into the radiator, to excite the radiator to generate a $TM_{01}$ mode.

13. The microstrip antenna according to claim 12, wherein the third matching circuit comprises a third inductor, wherein a first end of the third inductor is electrically connected to the third feed, and a second end of the third inductor is electrically connected to the third feedpoint, and wherein the third matching circuit is configured to feed a signal into the radiator through the third feedpoint.

14. The microstrip antenna according to claim 12, wherein the third feedpoint is located at a central position of the radiator in the second direction.

15. The microstrip antenna according to claim 2, wherein a first through groove is provided in the radiator, a length of the first through groove extends in the second direction, and the first through groove is provided in the first direction and spaced apart from the first feedpoint.

16. The microstrip antenna according to claim 15, wherein a second through groove is provided in the radiator, and the first and second through grooves are symmetrically disposed with respect to a center of the radiator.

17. The microstrip antenna according to claim 15, wherein a first electrical length of the radiator in the first direction is equal to a wavelength of an operating frequency band of the microstrip antenna, and a second electrical length of the radiator in the second direction is a half of the wavelength of the operating frequency band of the microstrip antenna.

18. The microstrip antenna according to claim 2, wherein the second feedpoints are located at a central position of the radiator in the first direction.

19. The microstrip antenna according to claim 1, wherein an operating frequency band of the $TM_{02}$ mode is the same as an operating frequency band of the $TM_{10}$ mode.

20. An electronic device, wherein the electronic device comprises:

a circuit board; and a microstrip antenna, comprising:

a radiator electrically connected to the circuit board; and a first feed and a second feed, wherein a first feedpoint and two second feedpoints are disposed on the radiator, the first feedpoint is located at a central position of the radiator and is electrically connected to the first feed, the first feedpoint is configured to feed a first radio frequency signal into the radiator to excite the radiator to generate a $TM_{02}$ mode, and wherein the two second feedpoints are spaced apart from the first feedpoint, the second feed is electrically connected to the second feedpoints through an adjustment circuit, the second feedpoints are configured to feed a second radio frequency signal into the radiator, and the second feedpoints are configured to excite the radiator to generate a $TM_{10}$ mode through the adjustment circuit to perform as a dual-microstrip antenna.

* * * * *